(12) United States Patent
Johnson et al.

(10) Patent No.: US 12,098,994 B2
(45) Date of Patent: *Sep. 24, 2024

(54) DROPLET SORTING DECISION MODULES, SYSTEMS AND METHODS OF USE THEREOF

(71) Applicant: Becton, Dickinson and Company, Franklin Lakes, NJ (US)

(72) Inventors: Peter Johnson, Santa Cruz, CA (US); Lingjie Wei, Milpitas, CA (US); Wilson On, Pleasanton, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/369,439

(22) Filed: Jul. 7, 2021

(65) Prior Publication Data

US 2021/0333193 A1 Oct. 28, 2021

Related U.S. Application Data

(63) Continuation of application No. 16/725,756, filed on Dec. 23, 2019, now Pat. No. 11,085,868.

(Continued)

(51) Int. Cl.
*G01N 15/1429* (2024.01)
*G01N 15/14* (2006.01)
*G01N 15/149* (2024.01)

(52) U.S. Cl.
CPC .......... *G01N 15/1429* (2013.01); *G01N 2015/1481* (2013.01); *G01N 15/149* (2024.01)

(58) Field of Classification Search
CPC ....... G01N 15/1429; G01N 2015/1481; G01N 2015/149; G01N 15/1459; G01N 2015/1006

See application file for complete search history.

(56) References Cited

U.S. PATENT DOCUMENTS

| | | | |
|---|---|---|---|
| 4,347,935 A | * | 9/1982 | Merrill ............... G01N 15/1429 209/579 |
| 6,281,018 B1 | | 8/2001 | Kirouac et al. |
| 11,085,868 B2 | * | 8/2021 | Johnson ............ G01N 15/1459 |

(Continued)

FOREIGN PATENT DOCUMENTS

| | | |
|---|---|---|
| EP | 1058831 A1 | 12/2000 |
| WO | WO1999044035 A1 | 9/1999 |
| WO | WO2013119924 A1 | 8/2013 |

OTHER PUBLICATIONS

Mccutcheon, et al. "Flexible Sorting Decision and Droplet Charging Control Electronic Circuitry for Flow Cytometer-Cell Sorters'", Society for Analytical Cytology, vol. 2, No. 4, 1982, 7 pages.

*Primary Examiner* — Tri T Ton

(74) *Attorney, Agent, or Firm* — Khin K. Chin; Bret E. Field; Bozicevic, Field & Francis LLP

(57) ABSTRACT

Droplet sorting modules for sorting droplets of a flow stream are described. Droplet sorting modules according to certain embodiments include a plurality of droplet sort decision units and a processor with memory operably coupled to the processor, where the memory includes instructions stored thereon, which when executed by the processor, cause the processor to determine an optimal droplet sort decision unit from the plurality of sort decision units for sorting each droplet of the flow stream. Particle (e.g., cells) sorting systems and methods for sorting droplets of a flow stream are also described. Kits having one or more of the subject droplet sorting modules are also provided.

22 Claims, 23 Drawing Sheets

Related U.S. Application Data

(60) Provisional application No. 62/803,264, filed on Feb. 8, 2019.

(56) References Cited

U.S. PATENT DOCUMENTS

| | | |
|---|---|---|
| 2008/0255705 A1 | 10/2008 | Degeal et al. |
| 2012/0012508 A1 | 1/2012 | Deshpande et al. |
| 2017/0227440 A1 | 8/2017 | Smith et al. |
| 2017/0241889 A1 | 8/2017 | Otsuka et al. |
| 2018/0313740 A1* | 11/2018 | Otsuka ............... G01N 15/1425 |
| 2019/0040356 A1* | 2/2019 | Durack ................... C12Q 1/02 |

* cited by examiner

DROPLET SORTING DECISION MODULES, SYSTEMS AND METHODS OF USE THEREOF

CROSS-REFERENCE TO RELATED APPLICATION

This application is a continuation of U.S. application Ser. No. 16/725,756, filed Dec. 23, 2019, which claims priority to the filing date of U.S. Provisional Patent Application Ser. No. 62/803,264 filed Feb. 8, 2019; the disclosure of which applications are herein incorporated by reference.

INTRODUCTION

Light detection can be used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. Using data generated from the detected light, distributions of the components can be recorded and where desired material may be sorted. To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

SUMMARY

Aspects of the present disclosure include droplet sorting modules for sorting droplets of a flow stream. Droplet sorting modules according to certain embodiments include a plurality of droplet sort decision units and a processor with memory operably coupled to the processor, where the memory includes instructions stored thereon, which when executed by the processor, cause the processor to determine an optimal droplet sort decision unit from the plurality of sort decision units for sorting each droplet of the flow stream. In embodiments, each droplet sort decision unit includes event match logic and sort decision logic. In some instances, the event match logic is configured to generate a data signal that a droplet has a particle. For example, the particle may be a target cell or a non-target cell. In other instances, the sort decision logic is configured to receive a data signal corresponding to the position of one or more particles in the droplet. For example, the sort decision logic may be configured to divide the droplet into 32 or more positions and the sort decision logic is configured to receive a data signal corresponding to the particle position in the 32 or more positions in the droplet. In some embodiments, the sort decision logic is configured to receive a data signal corresponding to the position of one or more particles in a plurality of sequential droplets. For instance, the sort decision logic may be configured to receive a data signal corresponding to the position of one or more particles in three sequential droplets. In some embodiments, the sort decision logic includes a target mask that identifies positions of target cells that are relevant to sorting the droplet and a non-target mask that identifies positions of non-target particles that are relevant to sorting the droplet. In some instances, the sort decision logic is configured to apply the target mask to the data signal corresponding to the position of the one or more target cells in the droplet to generate a target drop value, apply the non-target mask to the data signal corresponding to the position of the one or more non-target particles in the droplet to generate a non-target drop value and combine the target drop value with the non-target drop value to generate a target match value. In these embodiments, the sort decision logic is configured to determine the number of target cells in the droplet to generate a target count value. In some instances, the memory includes instructions which when executed by the processor cause the processor to compare the target count value and the target match value for each sort decision unit and determine the optimal sort decision unit for sorting the droplet based on the target count value and the target match value of each sort decision unit. In some embodiments, the memory includes instructions which when executed by the processor cause the processor to rank each sort decision unit based on the target match values. In other embodiments, the memory includes instructions which when executed by the processor cause the processor to determine that the sort decision unit that is optimal for sorting the droplet is the sort decision unit having the highest target match value. In yet other embodiments, the memory includes instructions which when executed by the processor cause the processor to determine that the sort decision unit is not optimal for sorting the droplet when the target count value exceeds a predetermined threshold. In still other embodiments, the memory includes instructions which when executed by the processor cause the processor to determine that a sort decision unit is not optimal for sorting the droplet when the sort decision unit was used for sorting a preceding droplet.

Aspects of the disclosure also include methods for sorting droplets of a flow stream. Methods according to certain embodiments include detecting a particle in a droplet, generating a data signal that the droplet includes the particle, receiving the data signal with a droplet sorting module having a plurality of droplet sort decision units, determining an optimal droplet sort decision unit from the plurality of sort decision units for sorting the droplet and sorting the droplet with the determined optimal droplet sort decision unit. In some embodiments, methods include determining the position of the particle in the droplet. For example, the particle may be a target cell or a non-target cell. Determining the particle position in the droplet may include determining the position of one or more particles in a plurality of sequential droplets. In some instances, methods include determining the position of one or more particles in three sequential droplets. In some embodiments, methods include applying a target mask that identifies positions of target cells that are relevant to sorting the droplet and applying a non-target mask that identifies positions of non-target particles that are relevant to sorting the droplet. In other embodiments, methods further include applying the target mask to a data signal corresponding to the position of one or more target cells in the droplet to generate a target drop value, applying the non-target mask to a data signal corresponding to the position of one or more non-target particles in the droplet to generate a non-target drop value and combining the target drop value with the non-target drop value to generate a target match value. In some instances, methods include determining the number of target cells in the droplet to generate a target count value. In other instances, methods include comparing the target count value and the target match value for each sort decision unit and determining the optimal sort decision unit for sorting the droplet based on the target count value and the target match value of each sort decision unit. In yet other instances, methods include determining the optimal sort decision unit for sorting the droplet includes ranking each sort decision unit based on the target match values. For example, determining the optimal sort decision unit for sorting the droplet includes determining the sort decision unit comprising the highest target match value. In some embodiments, methods include determining that the sort decision unit is not optimal for sorting the droplet when the target count value exceeds a predetermined threshold. For instance, determining that a sort decision unit is not optimal for sorting the droplet includes determining when the sort decision unit was used for sorting a preceding droplet.

Aspects of the present disclosure include a cell sorter suitable for practicing the subject methods, where the cell sorter includes one or more drop sorting modules for sorting droplets of a flow stream. Cell sorters according to certain embodiments include a flow cell configured to propagate a sample having particles in a flow stream, one or more sample containers configured to collected sorted droplets from the flow stream and one or more droplet sorting modules as described above. Kits including one or more components of the subject sort decision modules are also provided. Kits according to certain embodiments, may also include a flow cell and one or more containers for collecting sorted droplets from a flow stream.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
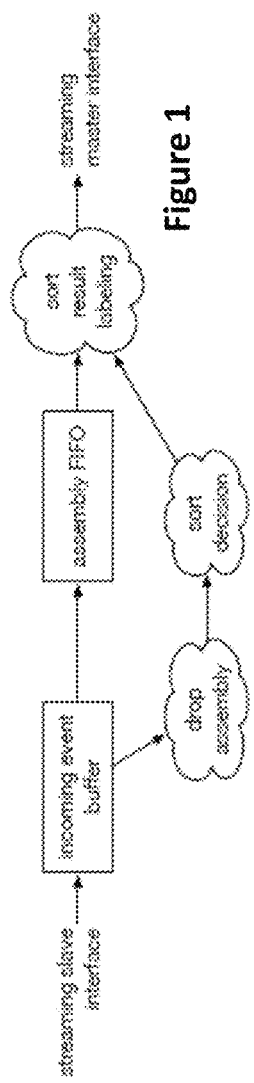
FIG. 1 depicts an event dataflow in a droplet sorting module according to certain embodiments.

Droplet sorting modules for sorting droplets of a flow stream are described. Droplet sorting modules according to certain embodiments include a plurality of droplet sort decision units and a processor with memory operably coupled to the processor, where the memory includes instructions stored thereon, which when executed by the processor, cause the processor to determine an optimal droplet sort decision unit from the plurality of sort decision units for sorting each droplet of the flow stream. Particle (e.g., cells) sorting systems and methods for sorting droplets of a flow stream are also described. Kits having one or more of the subject droplet sorting modules are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides for sort decision modules having a plurality of droplet sort decision units. In further describing embodiments of the disclosure, droplet sorting modules having a plurality of droplet sort decision units and a processor with memory operably coupled to the processor, where the memory includes instructions stored thereon, which when executed by the processor, cause the processor to determine an optimal droplet sort decision unit from the plurality of sort decision units for sorting each droplet of the flow stream are described first in greater detail. Next, methods for sorting droplets in a flow stream are described. Particle sorting systems for sorting droplets of a flow stream suitable for practicing the subject methods are also provided.

Droplet Sorting Modules

Aspects of the present disclosure include droplet sorting modules for sorting droplets of a flow stream. Droplet sorting modules according to embodiments include a plurality of droplet sort decision units where, in some instances, each sort decision unit is configured to convey a droplet to a corresponding receiving container or location. The term "unit" is used in its conventional sense to refer to computational hardware employed to perform the sort decision algorithms described herein. Any convenient computational hardware protocol can be employed, such as integrated circuits, programmable logic blocks, among other types of computational hardware. In certain embodiments, computational units described herein include field programmable gate arrays (FPGA). In some instances, droplet sorting modules include 2 or more sort decision units which correspond to 2 different corresponding receiving containers or locations, such as 4 or more sort decision units which correspond to 4 different corresponding receiving containers or locations, such as 8 or more sort decision units which correspond to 8 different corresponding receiving containers or locations, such as 16 or more sort decision units which correspond to 16 different corresponding receiving containers or locations and including 32 or more sort decision units which correspond to 32 different corresponding receiving containers or locations. The term "sorting" is used herein in its conventional sense to refer to separating components (e.g., droplets containing cells, droplets containing non-cellular particles such as biological macromolecules) of a sample and in some instances, delivering the separated components to one or more ports coupled to sample collection containers. For example, the subject droplet sorting modules may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container at the receiving location.

In embodiments, droplet sorting modules include a plurality of droplet sort decision units, such as 2 or more sort decision units, such as 3 or more sort decision units, such as 4 or more sort decision units, such as 6 or more sort decision units, such as 8 or more sort decision units, such as 12 or more sort decision units, such as 16 or more sort decision units, such as 24 or more sort decision units, such as 32 or more sort decision units, such as 64 or more sort decision units and including 128 or more sort decision units. Each sort decision unit has event match logic and sort decision logic and are configured to receive a data signal and determine an optimal droplet sort decision unit from a plurality of sort decision units for sorting each droplet of a flow stream. In some embodiments, the data signal received by each sort decision unit includes data corresponding to one or more events (e.g., particle, cell, etc.) such as event identification, event timestamp and event gate values.

In embodiments, each droplet sort decision unit includes event match logic which is configured to convert event gate bits into match bits, which as described in greater detail below, are used to determine whether the sort decision unit is optimal for sorting the event-containing droplet from the flow stream. The event match logic is formed from a plurality of event match units that are in electrical communication, such as 2 or more event match units, such as 4 or more event match units, such as 8 or more event match units, such as 16 event match units, such as 32 or more event match units, such as 64 event match units and including 128 or more event match units.

In some embodiments, the event match logic of each droplet sort decision unit is configured to convert one or more event gate bits into a single match bit, such as 2 or more event gate bits, such as 3 or more, such as 4 or more, such as 8 or more, such as 16 or more, such as 32 or more, such as 64 or more and including 128 or more event gate bits. In certain instances, each event match unit of the event match logic is configured to convert 32 event gate bits into a single match bit. In some embodiments, the event match logic is configured to determine whether an event can participate in a sort decision for a given sort decision unit. In certain embodiments, each sort decision unit includes an event match logic which is configured to match all events (i.e., both target and non-target particles) and all of the sort decision units are configured to use the data from this event match logic to match the positions of non-matching events in the droplets. In some instances, each of the event match units selects an event gate bit and a single match bit is outputted from the event match logic based on the selected event gate bits.

Data corresponding to each event such as the match bits from the event match logic, event timestamp, previous event identifiers, current time as well as droplet timing information is used to form a droplet (e.g., in a droplet assembly) that is divided by sort decision logic to have a plurality of bit positions, such as droplets with 2 or more bit positions, such as 4 or more bit positions, such as 8 or more bit positions, such as 16 or more bit positions, such as 32 or more bit positions, such as 64 or more bit positions and including droplets having 128 or more bit positions. In certain embodiments, the match bits from the event match logic, event timestamp, previous event identifiers, current time as well as droplet timing information is used to form a droplet that is divided by sort decision logic to have 32 bit positions.

In embodiments, each sort decision unit includes a sort decision logic configured to receive a data signal corresponding to the position of one or more particles in a droplet. Particles in the droplet may occupy one or more bit positions in the droplet, such as 2 or more bit positions, such as 4 or more bit positions and including 8 or more bit positions. In certain instances, a particle occupies a single bit position in the droplet. The particles in the droplet may be target particles (e.g., target cells) or non-target particles (e.g., non-target cells or non-cellular components of a sample). Each droplet may include one or more target particles at different bit positions within the droplet, such as 2 or more, such as 3 or more, such as 4 or more and including 5 or more target particles at different bit positions within the droplet. Each droplet may also include one or more non-target particles at different bit positions within the droplet, such as 2 or more, such as 3 or more, such as 4 or more and including 5 or more non-target particles at different bit positions within the droplet. In some embodiments, the sort decision logic is configured to receive a data signal corresponding to the position of one or more particles in a plurality of sequential droplets, such as 2 or more sequential droplets, such as 3 or more sequential droplets, such as 4 or more sequential droplets, such as 5 or more sequential droplets, such as 6 or more sequential droplets and including receiving a data signal corresponding to the position of one or more particles in 10 or more sequential droplets. In certain embodiments, the sort decision logic of each sort decision unit is configured to receive a data signal corresponding to the position of particles in three sequential droplets, such as for example, particle positions in a drop being sorted (i.e., sort drop), a drop directly ahead of the sort drop (i.e., leading drop) and a drop directly following the sort drop (i.e., trailing drop).

In some embodiments, the sort decision logic of each sort decision unit is configured to receive a data signal corresponding to the bit position of target particles in each droplet (e.g., in a trailing drop, a sort drop and a leading drop). In other embodiments, the sort decision logic of each sort decision unit is configured to receive a data signal corresponding to the bit position of non-target particle in each droplet. In some instances, the sort decision logic includes a target mask that identifies the positions of the droplet having target particles (e.g., cells) that are relevant to the sorting of the droplet. In other instances, the sort decision logic includes a non-target mask that identifies positions of the droplet having non-target particles (e.g., non-target cells or non-cellular particles) that are relevant to the sorting of the droplet. In certain instances, the sort decision logic includes a target mask that identifies the positions of the droplet having target particles that are relevant to the sorting of the droplet and a non-target mask that identifies positions of the droplet having non-target particles that are relevant to the sorting of the droplet. For sorting the droplet, the sort decision logic, in certain embodiments, is configured to apply the target mask to the data signal corresponding to the position of the one or more target cells in the droplet to generate a target drop value, apply the non-target mask to the data signal corresponding to the position of the one or more non-target particles in the droplet to generate a non-target drop value, and combine the target drop value with the non-target drop value to generate a target match value.

The sort decision logic may also be configured to determine the number of target particles in the droplet to generate a target count value. For example, the sort decision logic may be configured to determine that the droplet includes 1 or more target particle, such as 2 or more target particles, such as 3 or more target particles and including 5 or more target particles. In some embodiments, each sort decision unit has a target limit value that limits the total number of permitted target particles in a droplet, such as a target limit value of 16 target particles or less, such as 12 target particles or less, such as 8 target particles or less, such as 4 target particles or less and including 2 target particles or less. Where the droplet does not exceed the target limit value, the sort decision unit is configured to proceed with sorting the droplet. In certain instances, where the droplet is determined to exceed the target limit value, the droplet is discarded and is not sorted by any of the sort decision units in the droplet sorting module.

Based on the target match value and the target count value, an optimal sort decision unit for sorting each droplet from the flow stream is determined. A priority is assigned to each sort decision unit based on one or more of the droplet target match value, the droplet target count value or a combination thereof. To determine the optimal sort decision unit, the priorities of each sort decision unit is assessed, where in certain instances, the sort decision units are ranked by priority based on the sort decision units with the highest target match value, the sort decision units with the highest target count value or the sort decision units with the highest target match value and the highest target count value. For example, in one embodiment, the sort decision unit that has the highest target match value is determined to have the highest priority and is selected as the optimal sort decision unit for sorting the droplet. In another example, the sort decision unit that has the highest target count value is determined to have the highest priority and is selected as the optimal sort decision unit for sorting the droplet. In still another example, the sort decision unit that has the highest target match value and the highest count value is determined to have the highest priority and is selected as the optimal sort decision unit for sorting the droplet.

In certain embodiments, a sort decision unit is determined as being not optimal for sorting a droplet in a flow stream. In some instances, a sort decision unit is determined as being not optimal for sorting a droplet when the target match value is below a predetermined threshold. In other instances, a sort decision unit is determined as being not optimal for sorting a droplet when the target count value exceeds a predetermined threshold. In still other instances, a sort decision unit is determined as being not optimal for sorting a droplet when the sort decision unit was used for sorting a preceding droplet (e.g., was used to sort the leading drop in a sequential three droplet sequence having a leading drop, a sort drop and a trailing drop).

Methods for Sorting Particles of a Sample

Aspects of the present disclosure also include methods for sorting droplets of a flow stream. In practicing methods according to certain embodiments, a particle is detected in a droplet in a flow stream, a data signal is generated that the droplet includes the particle, the data signal is conveyed to a droplet sorting module having a plurality of droplet sort decision units (as described above) and an optimal sort decision unit is selected from the plurality of droplet sort decision units to sort the droplet and the droplet is sorted with the selected droplet sort decision unit.

In embodiments, a flow stream containing a sample having particles (e.g., cells) is irradiated with a light source and light from the components in the flow stream is detected. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include detecting a particle in the flow stream by measuring light from the irradiated sample with one or more photodetectors. In some instances, the particle is a target particle, such as a target cell. In other instances, the particle is a non-target particle, such as a non-target cell or a non-cellular particle. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

The particle may be detected by any convenient light detection protocol, including but not limited to light absorption, forward scattering, side scattering or luminescence (e.g., fluorescence). In practicing the subject methods, a droplet is formed from the flow stream and contains one or more of the detected particles and a data signal is generated that the droplet contains the particle. The data signal is received by a droplet sorting module (as described in detail above) and an optimal sort decision unit from the droplet sorting module for sorting the droplet is determined. As described above, each sort decision unit may, in some instances correspond to a receiving container or location for sorting the droplet. As such, methods according to certain embodiments include sorting droplets to specific containers or locations which correspond to the sort decision unit determined to be optimal for sorting the droplet. For example, droplet sorting modules may include 2 or more sort decision units which correspond to 2 different corresponding receiving containers or locations, such as 4 or more sort decision units which correspond to 4 different corresponding receiving containers or locations, such as 8 or more sort decision units which correspond to 8 different corresponding receiving containers or locations, such as 16 or more sort decision units which correspond to 16 different corresponding receiving containers or locations and including 32 or more sort decision units which correspond to 32 different corresponding receiving containers or locations.

In embodiments, each droplet sort decision unit includes event match logic which converts event gate bits into match bits. The event match logic is formed from a plurality of matching units. In some embodiments, the event match logic of each droplet sort decision unit converts one or more event gate bits into a single match bit, such as 2 or more event gate bits, such as 3 or more, such as 4 or more, such as 8 or more, such as 16 or more, such as 32 or more, such as 64 or more and including 128 or more event gate bits. In certain instances, each event match unit of the event match logic converts 32 event gate bits into a single match bit. In some embodiments, the event match logic determines whether an event can participate in a sort decision for a given sort decision unit. In certain embodiments, each sort decision unit includes an event match logic which is configured to match all events (i.e., both target and non-target particles) and all of the sort decision units are configured to use the data from this event match logic to match the positions of non-matching events in the droplets. In some instances, each of the event match units selects an event gate bit and a single match bit is outputted from the event match logic based on the selected event gate bits.

Data such as the match bits from the event match logic, event timestamp, previous event identifiers, current time as well as droplet timing information is used to form a droplet (e.g., in a droplet assembly). The droplet is divided into a plurality of bit positions, such as droplets with 2 or more bit positions, such as 4 or more bit positions, such as 8 or more bit positions, such as 16 or more bit positions, such as 32 or more bit positions, such as 64 or more bit positions and including droplets having 128 or more bit positions. In certain embodiments, the data signal (e.g., match bits from the event match logic, event timestamp, previous event identifiers, current time, droplet timing information) is used to form a droplet that is divided by sort decision logic to have 32 bit positions.

In practicing the subject methods, the position of one or more particles in the droplet are determined. For example, particles in the droplet may occupy one or more bit positions in the droplet, such as 2 or more bit positions, such as 4 or more bit positions and including 8 or more bit positions. In certain instances, a particle occupies a single bit position in the droplet. The particles in the droplet may be target particles (e.g., target cells) or non-target particles (e.g., non-target cells or non-cellular components of a sample). Each droplet may include one or more target particles at different bit positions within the droplet, such as 2 or more, such as 3 or more, such as 4 or more and including 5 or more target particles at different bit positions within the droplet. Each droplet may also include one or more non-target particles at different bit positions within the droplet, such as 2 or more, such as 3 or more, such as 4 or more and including 5 or more non-target particles at different bit positions within the droplet.

In some embodiments, methods include generating a data signal corresponding to the position of one or more particles in a plurality of sequential droplets, such as 2 or more sequential droplets, such as 3 or more sequential droplets, such as 4 or more sequential droplets, such as 5 or more sequential droplets, such as 6 or more sequential droplets and including generating a data signal corresponding to the position of one or more particles in 10 or more sequential droplets. In certain embodiments, methods include determining and generating a data signal corresponding to the position of particles in three sequential droplets, such as for example, particle positions in a drop being sorted (i.e., sort drop), a drop directly ahead of the sort drop (i.e., leading drop) and a drop directly following the sort drop (i.e., trailing drop).

In some embodiments, a data signal corresponding to the bit position of target particles in each droplet (e.g., in a trailing drop, a sort drop and a leading drop) is conveyed to sort decision logic of each sort decision unit. In other embodiments, a data signal corresponding to the bit position of non-target particles in each droplet (e.g., in a trailing drop, a sort drop and a leading drop) is conveyed to sort decision logic of each sort decision unit. In some instances, methods include generating a target mask that identifies the positions of the droplet having target particles (e.g., cells) that are relevant to the sorting of the droplet. In other instances, methods include generating a non-target mask that identifies positions of the droplet having non-target particles (e.g., non-target cells or non-cellular particles) that are relevant to the sorting of the droplet. In yet other instances, methods include generating a target mask that identifies the positions of the droplet having target particles that are relevant to the sorting of the droplet and generating a non-target mask that identifies positions of the droplet having non-target particles that are relevant to the sorting of the droplet. In certain embodiments, methods include applying the target mask to the data signal corresponding to the position of the one or more target cells in the droplet to generate a target drop value, applying the non-target mask to the data signal corresponding to the position of the one or more non-target particles in the droplet to generate a non-target drop value, and combining the target drop value with the non-target drop value to generate a target match value.

In some embodiments, methods also include determining the number of target particles in the droplet to generate a target count value. In some instances, methods include determining that the droplet includes 1 or more target particle, such as 2 or more target particles, such as 3 or more target particles and including 5 or more target particles. In certain embodiments, the number of determined target particles in the droplet is compared to a target limit value that limits the number of permitted particles in a droplet, such as a target limit value of 16 target particles or less, such as 12 target particles or less, such as 8 target particles or less, such as 4 target particles or less and including 2 target particles or less. In some embodiments, when the target limit value has not been exceeded, methods include sorting the droplet with the sort decision unit that is selected as optimal. In other embodiments, when the target limit value has been exceeded, methods may include discarding the droplet altogether and not sorting the droplet with any of the sort decision units.

Based on the target match value and the target count value, an optimal sort decision unit for sorting each droplet from the flow stream is determined. Methods, in certain embodiments, include assigning a priority to each sort decision unit based on one or more of the droplet target match value, the droplet target count value or a combination thereof. To determine the optimal sort decision unit, the priorities of each sort decision unit is assessed, where in certain instances, the sort decision units are ranked by priority based on the sort decision units with the highest target match value, the sort decision units with the highest target count value or the sort decision units with the highest target match value and the highest target count value. For example, in one example, the sort decision unit that has the highest target match value is determined to have the highest priority and is selected as the optimal sort decision unit for sorting the droplet. In another example, the sort decision unit that has the highest target count value is determined to have the highest priority and is selected as the optimal sort decision unit for sorting the droplet. In still another example, the sort decision unit that has the highest target match value and the highest count value is determined to have the highest priority and is selected as the optimal sort decision unit for sorting the droplet.

In certain embodiments, methods include determining that a sort decision unit is not optimal for sorting a droplet in a flow stream. In some instances, a sort decision unit is determined as being not optimal for sorting a droplet when the target match value is below a predetermined threshold. In other instances, a sort decision unit is determined as being not optimal for sorting a droplet when the target count value exceeds a predetermined threshold. In still other instances, a sort decision unit is determined as being not optimal for sorting a droplet when the sort decision unit was used for sorting a preceding droplet (e.g., was used to sort the leading drop in a sequential three droplet sequence having a leading drop, a sort drop and a trailing drop).

Systems for Sorting Particles of a Sample

Aspects of the present disclosure also include a system for sorting particles. In embodiments, the subject systems are configured to sort components of a sample, such as cells in a biological sample. As described above, sorting refers to separating components (e.g., cells, non-cellular particles such as biological macromolecules) of the sample and in some instances delivering the separated components to one or more sample collection containers.

In embodiments, systems include a light source configured to irradiate a sample in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer-controlled beam stops for blocking and exposing the sample to the light source.

In embodiments, systems include a light detection system having a plurality of photodetectors. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to µm$^2$ to 10000 µm$^2$, such as from 50 to µm$^2$ to 9000 µm$^2$, such as from 75 to µm$^2$ to 8000 µm$^2$, such as from 100 to µm$^2$ to 7000 µm$^2$, such as from 150 to µm$^2$ to 6000 µm$^2$ and including from 200 to µm$^2$ to 5000 µm$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems are configured to form a droplet from a flow stream that contains one or more detected particles and generate a data signal that the droplet contains the particle. Systems include one or more droplet sorting modules as described herein and an optimal sort decision unit from the droplet sorting module is selected for sorting the droplet. In some embodiments, systems include a computer having a computer readable storage medium with a computer program stored thereon, where the computer program when loaded on the computer further includes instructions for determining an optimal droplet sort decision unit from the plurality of sort decision units for sorting each droplet of the flow stream.

In some embodiments systems include a computer having a computer readable storage medium with a computer program stored thereon, where the computer program when loaded on the computer further includes instructions for forming a data signal corresponding to a droplet that is divided into a plurality of bit positions, such as droplets with 2 or more bit positions, such as 4 or more bit positions, such as 8 or more bit positions, such as 16 or more bit positions, such as 32 or more bit positions, such as 64 or more bit positions and including droplets having 128 or more bit positions. Data such as the match bits from the event match logic, event timestamp, previous event identifiers, current time as well as droplet timing information is used to form the droplet for sorting by the droplet sort module. In some instances, the memory further includes instructions for determining the position of one or more particles in the droplet. In other instances, the memory further includes instructions for determining and generating a data signal corresponding to the position of one or more particles in a plurality of sequential droplets, such as 2 or more sequential droplets, such as 3 or more sequential droplets, such as 4 or more sequential droplets, such as 5 or more sequential droplets, such as 6 or more sequential droplets and including determining to the position of one or more particles in 10 or more sequential droplets. In certain embodiments, the memory further includes instructions for determining and generating a data signal corresponding to the position of particles in three sequential droplets, such as for example, particle positions in a drop being sorted (i.e., sort drop), a drop directly ahead of the sort drop (i.e., leading drop) and a drop directly following the sort drop (i.e., trailing drop).

In some embodiments, systems include a computer having a computer readable storage medium with a computer program stored thereon, where the computer program when loaded on the computer further includes instructions for conveying a data signal corresponding to the bit position of target particles in each droplet (e.g., in a trailing drop, a sort drop and a leading drop) to the sort decision logic of each sort decision unit. In other embodiments, the memory further includes instructions for conveying a data signal corresponding to the bit position of non-target particles in each droplet (e.g., in a trailing drop, a sort drop and a leading drop) to the sort decision logic of each sort decision unit.

In some embodiments, systems include a computer having a computer readable storage medium with a computer program stored thereon, where the computer program when loaded on the computer further includes instructions for generating a target mask identifies the positions of the droplet having target particles (e.g., cells) that are relevant to the sorting of the droplet. In other embodiments, the memory further includes instructions for generating a non-target mask that identifies positions of the droplet having non-target particles (e.g., non-target cells or non-cellular particles) that are relevant to the sorting of the droplet. In yet other embodiments, the memory further includes instructions for generating a target mask that identifies the positions of the droplet having target particles that are relevant to the sorting of the droplet and generating a non-target mask that identifies positions of the droplet having non-target particles that are relevant to the sorting of the droplet.

In some embodiments, systems include a computer having a computer readable storage medium with a computer program stored thereon, where the computer program when loaded on the computer further includes instructions for applying the target mask to the data signal corresponding to the position of the one or more target cells in the droplet to generate a target drop value, applying the non-target mask to the data signal corresponding to the position of the one or more non-target particles in the droplet to generate a non-target drop value, and combining the target drop value with the non-target drop value to generate a target match value.

In other embodiments, systems include a computer having a computer readable storage medium with a computer program stored thereon, where the computer program when loaded on the computer further includes instructions for determining the number of target particles in the droplet to generate a target count value. In some instances, the memory includes instructions for determining that the droplet includes 1 or more target particle, such as 2 or more target particles, such as 3 or more target particles and including 5 or more target particles. In other instances, the memory includes instructions for comparing the number of determined target particles in the droplet with a target limit value that limits the number of permitted particles in a droplet, such as a target limit value of 16 target particles or less, such as 12 target particles or less, such as 8 target particles or less, such as 4 target particles or less and including 2 target particles or less. In certain instances, the memory includes instructions for sorting the droplet with the sort decision unit that is selected as optimal when the target limit value has not been exceeded. In other instances, the memory includes instructions for discarding the droplet altogether and not sorting the droplet with any of the sort decision units when the target limit value has been exceeded.

In embodiments, systems include a computer having a computer readable storage medium with a computer program stored thereon, where the computer program when loaded on the computer further includes instructions for determining an optimal sort decision unit for sorting each droplet from the flow stream based on the target match value and the target count value. In these embodiments, the memory includes instructions for assigning a priority to each sort decision unit based on one or more of the droplet target match value, the droplet target count value or a combination thereof. To determine the optimal sort decision unit, the system is configured to assess the priorities of each sort decision unit, where in certain instances, the sort decision units are ranked by priority based on the sort decision units with the highest target match value, the sort decision units with the highest target count value or the sort decision units with the highest target match value and the highest target count value.

In some embodiments, systems are configured to determine that a sort decision unit is not optimal for sorting a droplet in a flow stream. In some instances, a sort decision unit is determined as being not optimal for sorting a droplet when the target match value is below a predetermined threshold. In other instances, systems are configured to determine a sort decision unit as not optimal for sorting a droplet when the target count value exceeds a predetermined threshold. In still other instances, systems are configured to determine a sort decision unit as being not optimal for sorting a droplet when the sort decision unit was used for sorting a preceding droplet (e.g., was used to sort the leading drop in a sequential three droplet sequence having a leading drop, a sort drop and a trailing drop).

Droplet sorting systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In certain embodiments, the subject systems include one or more optical adjustment components for adjusting the light such as light irradiated onto the sample (e.g., from a laser) or light collected from the sample (e.g., scattered, fluorescence). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, the subject systems include include a flow cell nozzle having a nozzle orifice configured to flow a flow stream through the flow cell nozzle. The subject flow cell nozzle has an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more, such as 100 µL/sec or more, such as 150 µL/sec or more, such as 200 µL/sec or more, such as 250 µL/sec or more, such as 300 µL/sec or more, such as 350 µL/sec or more, such as 400 µL/sec or more, such as 450 µL/sec or more and including 500 µL/sec or more. For example, the sample flow rate may range from 1 µL/sec to about 500 µL/sec, such as from 2 µL/sec to about 450 µL/sec, such as from 3 µL/sec to about 400 µL/sec, such as from 4 µL/sec to about 350 µL/sec, such as from 5 µL/sec to about 300 µL/sec, such as from 6 µL/sec to about 250 µL/sec, such as from 7 µL/sec to about 200 µL/sec, such as from 8 µL/sec to about 150 µL/sec, such as from 9 µL/sec to about 125 µL/sec and including from 10 µL/sec to about 100 µL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more. For example, the sheath fluid flow rate may range from 1 µL/sec to about 500 µL/sec, such as from 2 µL/sec to about 450 µL/sec, such as from 3 µL/sec to about 400 µL/sec, such as from 4 µL/sec to about 350 µL/sec, such as from 5 µL/sec to about 300 µL/sec, such as from 6 µL/sec to about 250 µL/sec, such as from 7 µL/sec to about 200 µL/sec, such as from 8 µL/sec to about 150 µL/sec, such as from 9 µL/sec to about 125 µL/sec and including from 10 µL/sec to about 100 µL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The subject systems, in certain instances, include a sample interrogation region in fluid communication with the flow cell nozzle orifice. In these instances, a sample flow stream emanates from an orifice at the distal end of the flow cell nozzle and particles in the flow stream may be irradiated with a light source at the sample interrogation region. The size of the interrogation region may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The interrogation region may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, the subject systems include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49 (pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference.

In certain embodiments, the subject particle systems are flow cytometric systems having an excitation module that uses radio-frequency multiplexed excitation to generate a plurality of frequency shifted beams of light. In these embodiments, the laser light generator may include a plurality of lasers and one or more acousto-optic components (e.g., an acoustooptic deflector, an acoustooptic frequency shifter) to generate a plurality of frequency shifted comb beams. In certain instances, the subject systems are flow cytometric systems having a laser excitation module as described in U.S. Pat. Nos. 9,423,353 and 9,784,661 and U.S. Patent Publication Nos. 2017/0133857 and 2017/0350803, the disclosures of which are herein incorporated by reference.

Kits

Aspects of the invention further include kits, where kits include one or more of the subject sort decision modules. In some embodiments, kits include one or more components for practicing the subject methods, such as a flow cell and one or more containers for collecting sorted droplets from a flow stream. In some embodiments, the kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit, e.g., the connectors, orifice plates are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems, and computer readable storage medium find use in a variety of different applications where it is desirable to accurately and conveniently sort droplets with a flow cytometer. The present disclosure also finds use in automating a flow cytometer so as to provide for fast, reliable systems for characterizing and sorting cells from a biological sample. Embodiments of the present disclosure find use where minimizing the amount of reliance on human input and adjustments to the system are desired, such as in research and high throughput laboratory testing. The present disclosure also finds use where it is desirable to provide a flow cytometer with improved cell sorting accuracy, enhanced particle collection, particle charging efficiency, more accurate particle charging and enhanced particle deflection during cell sorting. In embodiments, the present disclosure reduces the need for user input or manual adjustment of the flow cytometer or between sample analysis with the flow cytometer.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Experimental

The following examples are put forth so as to provide those of ordinary skill in the art with a complete disclosure and description of how to make and use the present invention, and are not intended to limit the scope of what the inventors regard as their invention.

Data Flow

When events flow into an incoming event buffer, the event is inspected for gate classification bits, event timestamp, and event ID values. The drop assembly logic then uses these values to determine the position of the event within the forming drop. When it determines the drop position, the event flows into an assembly first in-first out (FIFO), where it waits for the drop sort decision to be determined as described in detail above. Once a sort decision has been determined for the event, it flows out of the assembly FIFO. Then, after being labeled according to its drop destination, it exits the sort unit. FIG. 1 depicts an event dataflow in a droplet sorting module according to certain embodiments.

Drop Formation

Figure 2:
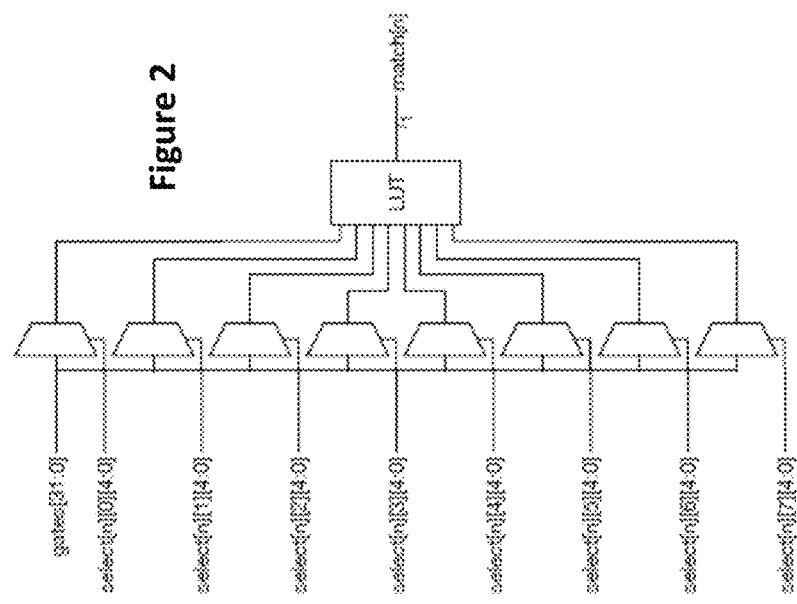
FIG. 2 depicts an event match logic according to certain embodiments.

An incoming event buffer parses the incoming events, presenting the event ID, event timestamp and event gate values to the drop formation logic. Each sort decision unit's event match logic converts an event's gate bits into a single match bit. The event match logic determines whether an event can participate in the sort decision for a given sort decision unit. A special wildcard matching unit matches all events, and all sort decision units use the drops formed by the wildcard matching unit to see the positions of non-matching events. In the sort unit, each of the 16 match units distill the 32 gate bits down to single match bits. An event match logic according to certain embodiments is depicted in FIG. 2. For each match unit, 8-32-to-1 mixes select a gate bit. These 8 selected gate bits are fed into a 256-by-1 bit lookup table, which selects a single match result.

Figure 3:
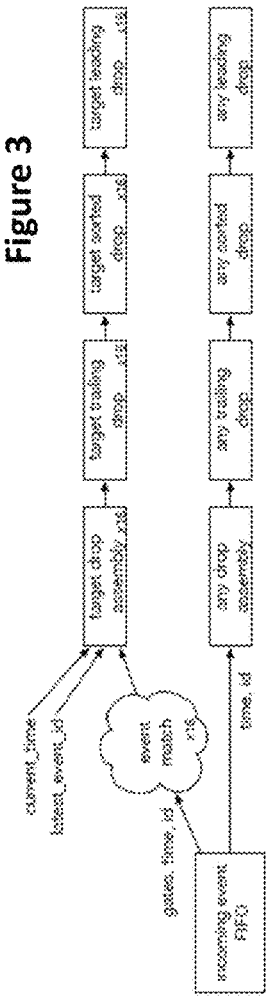
FIG. 3 depicts a flow chart for calculating a sort decision according to certain embodiments.

The match bits, the event timestamp, the latest event id and current time from the event processor, and the drop timing information are used to form a drop in the drop assembly buffer. The buffer contains 32 bits. A one in a bit position corresponds to a matching event in that portion of the drop, while a zero indicates a lack of an event at that location. Once the drop is assembled and all sorting decisions for preceding drops have been completed, the drop moves into the trailing drop buffer. At the same time, the trailing drop buffer moves into the sorted drop buffer, while the sorted drop moves into the leading drop buffer. After this occurs, a new sort decision can be calculated (see FIG. 3).

Sort Decision

Each of the 16 sort decision units looks for events that match a target pattern. These units receive 32-bit target drop values for the trailing, sorted, and leading drops, which indicate the positions of target events within the respective drops. The units, in addition, receive 32-bit any drop values for the trailing, sorted, and leading drops, with values that indicated the presence of any event in the drop. Two masks indicate event positions of interest to the sort unit: the target mask indicates which event positions which contain target particles are relevant for the sort decision. Conversely, the non-target mask indicates which event positions that contain non-target particles are relevant.

Figure 4:
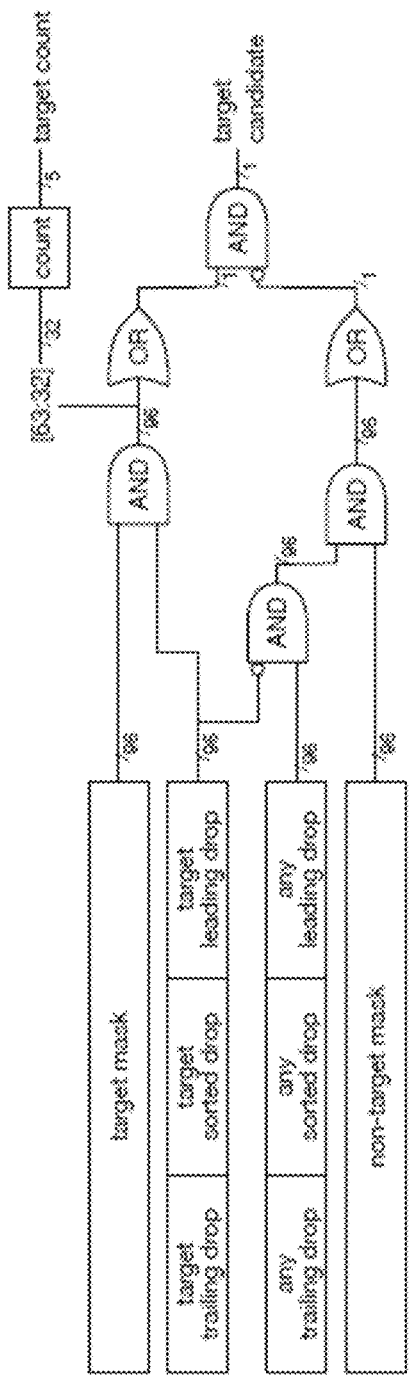
FIG. 4 depicts a flow chart for determining an optimal sort decision unit by applying a target mask and a non-target mask according to certain embodiments.

The inverse of the values for the target drop are logically AND-ed with the any drop values to produce a non-target drop value. This value is then AND-ed with the non-target mask. All 96 bits are then OR-ed together, producing a bit indicating a non-target event is in the area of interest. Similarly, the target drop information is AND-ed with the target mask. The resulting bits from this AND are OR-ed together. In addition, the number of bits set in the target AND result, representing the drop to be sorted, are counted. This produces a target count value indicating the number of target events in the area of interest within the drop to sort. The OR value from the target drop information and the OR value from the non-target drop are combined to produce a target match bit. (see FIG. 4)

Figure 5:
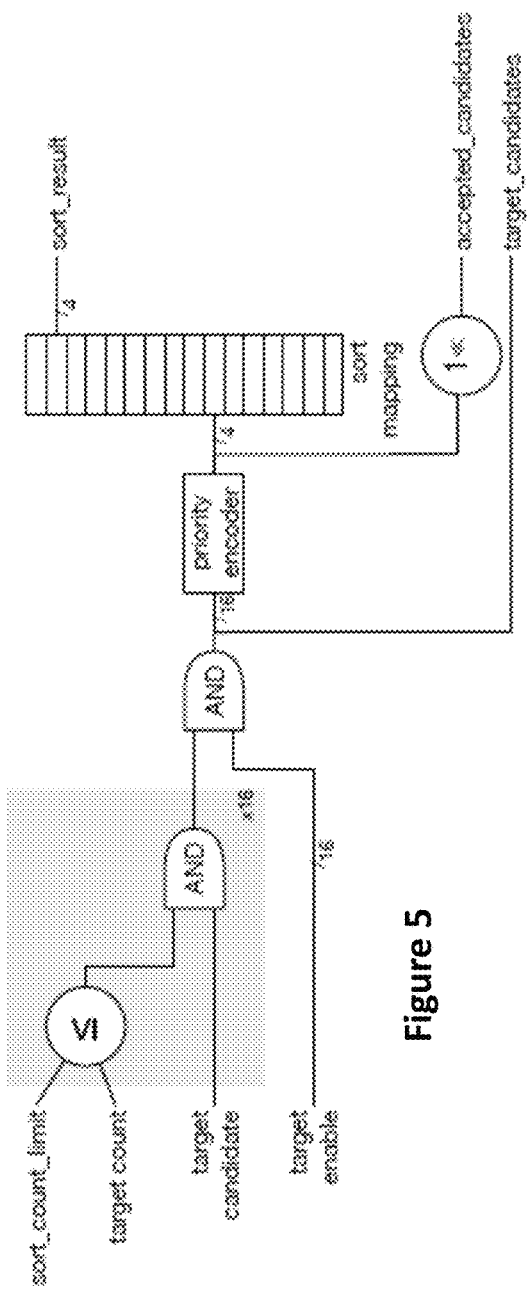
FIG. 5 depicts a flow chart for determining an optimal sort decision unit by applying a target match value and a target limit value according to certain embodiments.

Each sort decision unit also has a target limit value, limiting the total number of permitted target events in a drop. If the drop has less than the allowed number of target events, the drop is a target match, the sort unit is enabled, and this unit feeds the result into a priority encoder. The priority encoder then selects the sort unit with an active sort candidate and the highest priority. Then, the value undergoes a mapping to obtain the final sort result. This mapping allows multiple sort decision units to sort to the same sort result. (see FIG. 5)

Statistics

A separate statistics unit may be present to handle statistics counters on gate results and sort results. Counters in sort count the target candidate results, accepted candidate results, events sorted to each sort destination, and drops sorted to each sort destination. The target candidate counters can be used to obtain counts of events which matched, but which didn't get sorted to get "aborted events" statistics. Alternatively, a "waste" sort decision unit with low priority can be configured to catch and count events which matched but couldn't be sorted to get the "aborted events" count.

EXAMPLES

Figure 6:
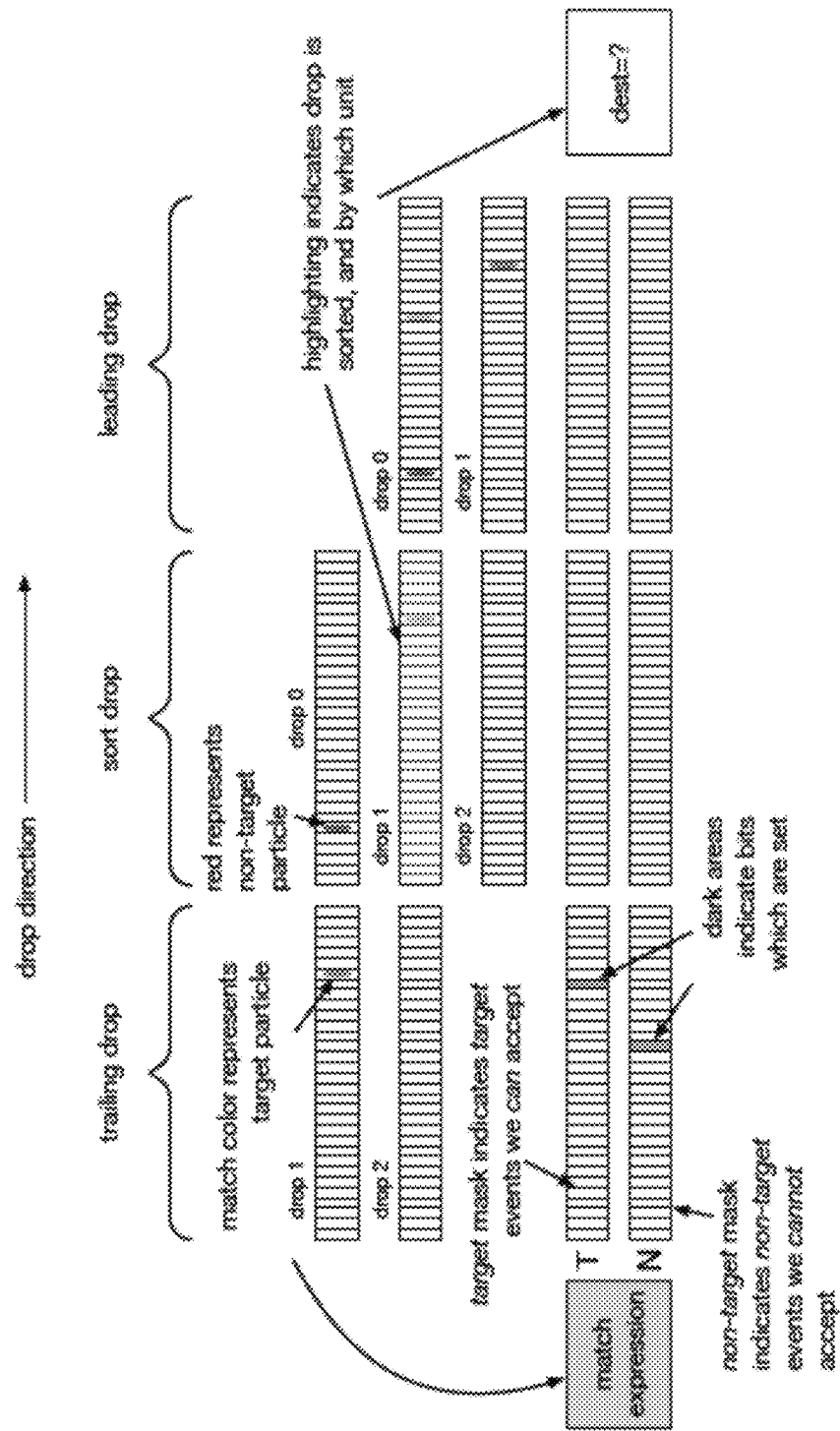
FIG. 6 depicts a mask programming diagram for sort decision units according to certain embodiments.

The following example diagrams illustrate mask programming for sort decision units according to certain embodiments. FIG. 6 depicts a general description for reading the mask programming diagrams. The three drop positions are shown from left to right. These positions represent the trailing, sort, and leading drops, with successive rows indicating their positions over time. The trailing drop from the first row becomes the sorted drop in the second row, while the sorted drop from the first row becomes the leading drop in the second row. The third row shows the original trailing drop moving into the leading position.

Each diagram shows the match expression on the left. This is the Boolean expression of gate bits indicating that an event matches for this sort decision unit. The coloring on the event match unit is the same as the target particles inside the drops. For example, if the match unit is colored green, it will match the green particles. If a particle is a different color from each match unit, that particle will be a non-target particle for all units. On the far right, a box indicates the sort destination for this sort decision unit. The drops in the sort position will be colored in the same way if the unit was responsible for sorting the drop. When the drop moves to the leading position, it will no longer be colored. Mask bits are indicated in the two rows in the center. The top row indicates the target mask bits, while the bottom row indicates the non-target mask bits. The two rows of mask bits are grouped into three columns. The leftmost column represents the trailing drop masks, the center column represents the sorted drop masks, and the rightmost represents the leading drop mask bits. Where multiple sort decision units are represented, the higher priority units will appear higher in the diagram.

Yield Sort

Figure 7:
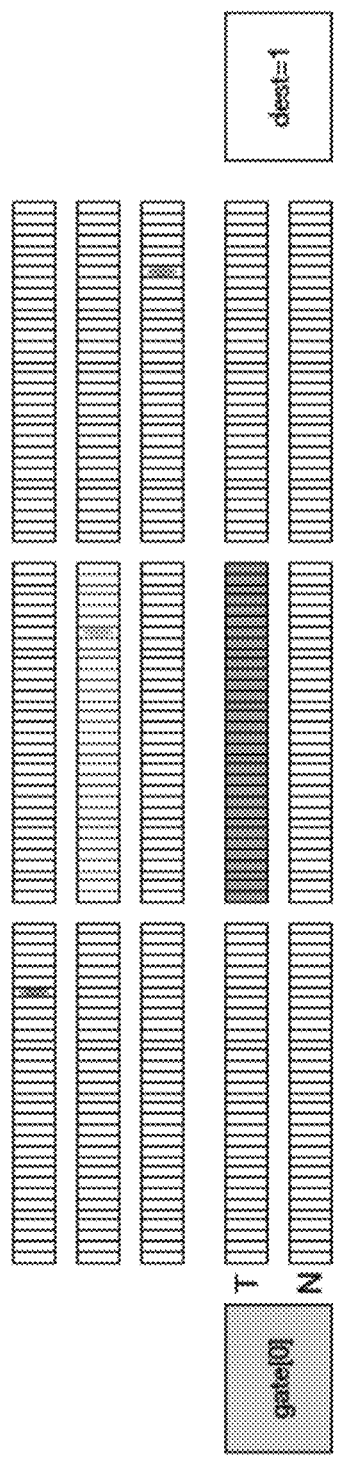
FIG. 7 depicts a mask programming diagram for a yield sort decision according to certain embodiments.

In a yield sort, a drop with gate bit zero is sorted to its destination, regardless of any other events the drop might contain. (see FIG. 7)

Drop Yield Sort—1

Figure 8:
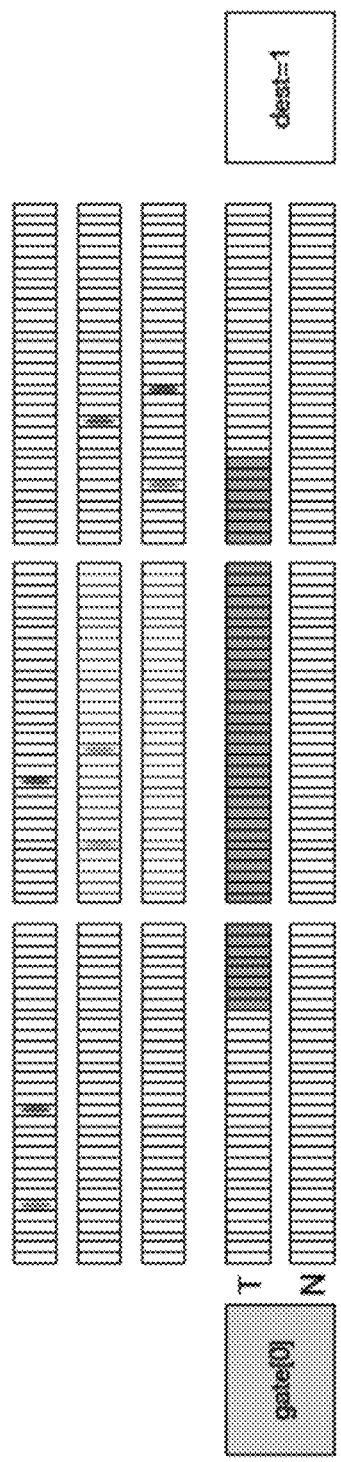
FIG. 8 depicts a mask programming diagram for a drop yield sort decision according to certain embodiments.

In a first drop yield sort, the sort aim is yield, but is also sorted to capture the leading or trailing drops if the event is in the first or last quarter of the drop respectively. (see FIG. 8)

Drop Yield Sort—2

Figure 9:
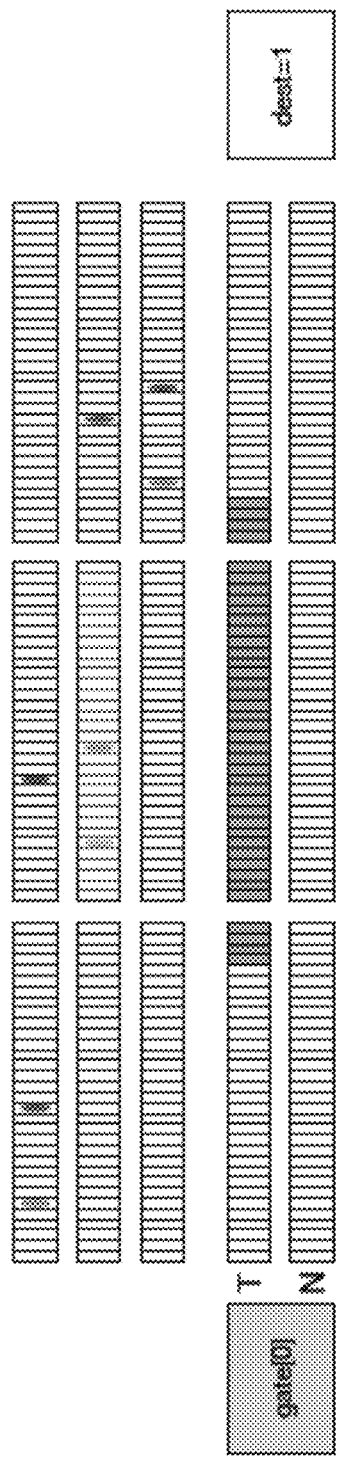
FIG. 9 depicts a mask programming diagram for a drop yield sort decision according to another embodiment.

In a second drop yield sort, the sort aim is yield, but is also sorted to capture the leading or trailing drops if the event is in the first or the last eighth of the drop, respectively. (see FIG. 9)

Phase Sort

Figure 10:
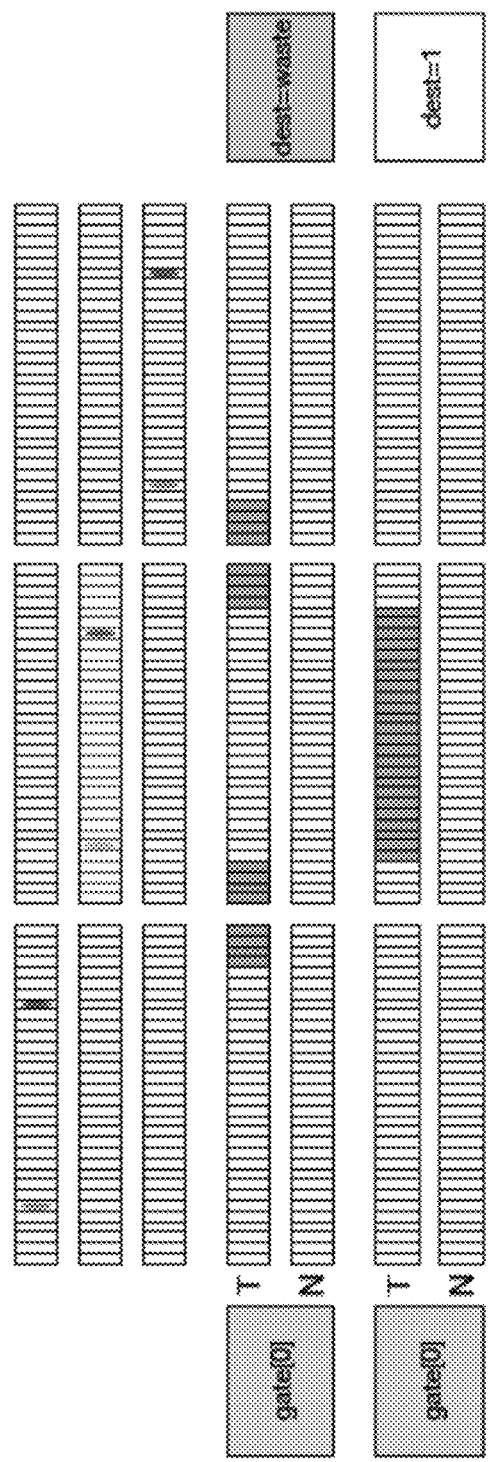
FIG. 10 depicts a mask programming diagram for a phase sort decision according to certain embodiments.
Figure 11:
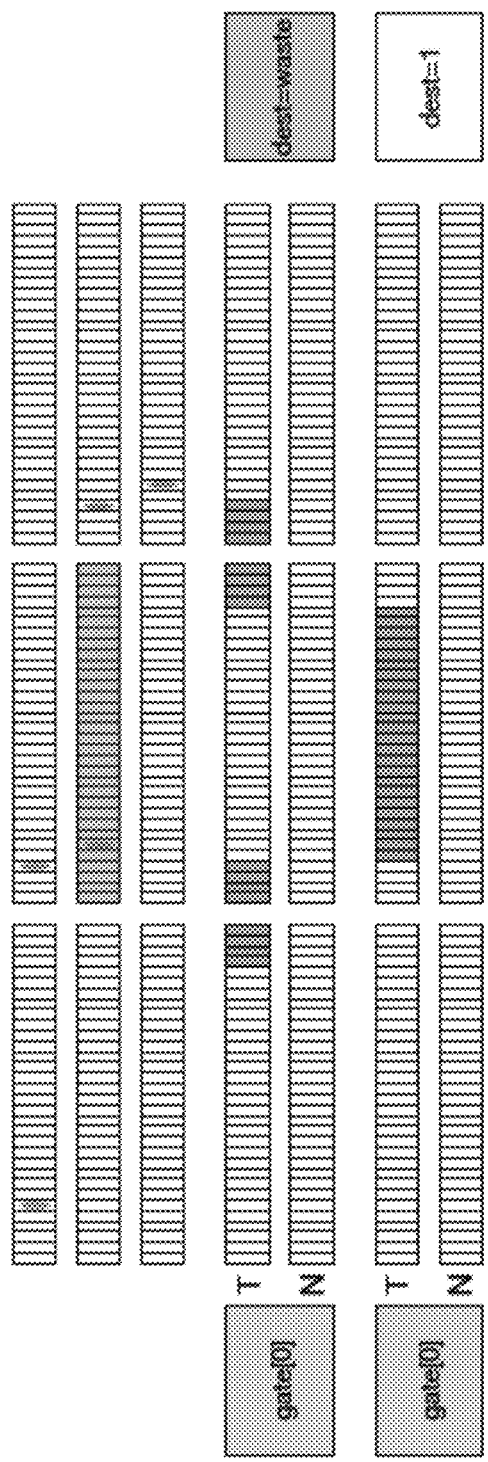
FIG. 11 depicts a mask programming diagram for a phase sort decision according to another embodiment.
Figure 12:
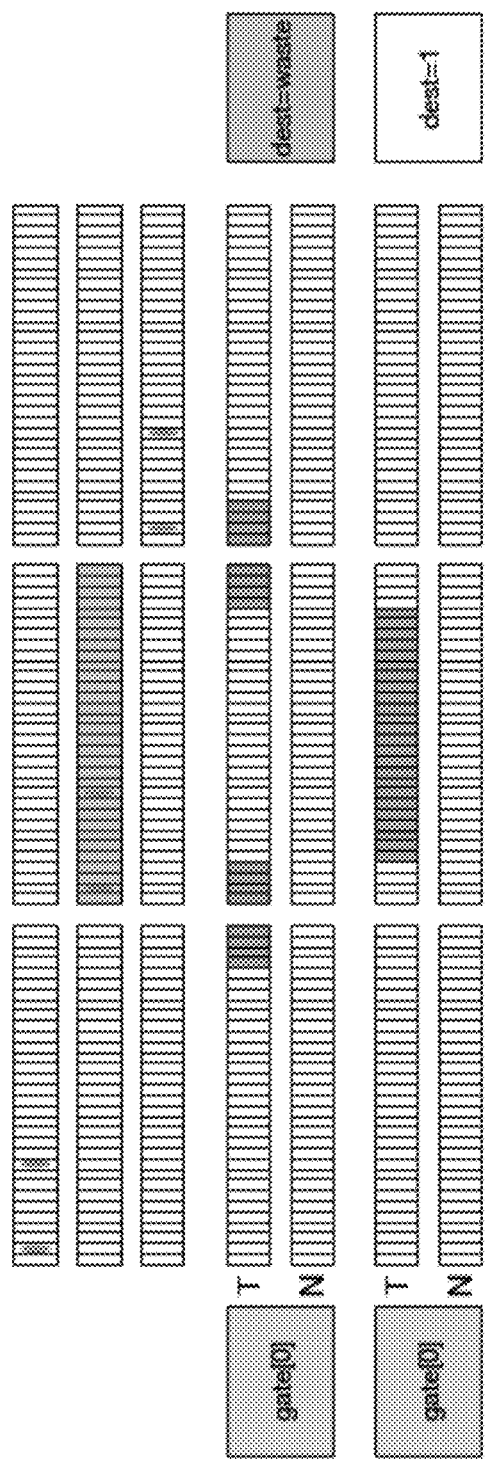
FIG. 12 depicts a mask programming diagram for a phase sort decision according to another embodiment.

In a phase sort, a drop is sorted to destination 1 if there are drops with gate bit zero. FIG. 10 depicts that the drop will only be sorted if the events are near the center of the drop. In order to have accurate counting, the drop will not be sorted if there are adjacent drops with target events near the drop's boundary. To match target events in the edges of the adjacent drops, a high-priority unit is used to waste these drops. These drops can also be sent to a yield destination as well. FIG. 11 depicts where a drop is sent to waste because of a target event near the edge of the leading drop. FIG. 12 depicts where a drop is rejected due to the target particle being too close to the drop edge.

Purity Sort

Figure 13:
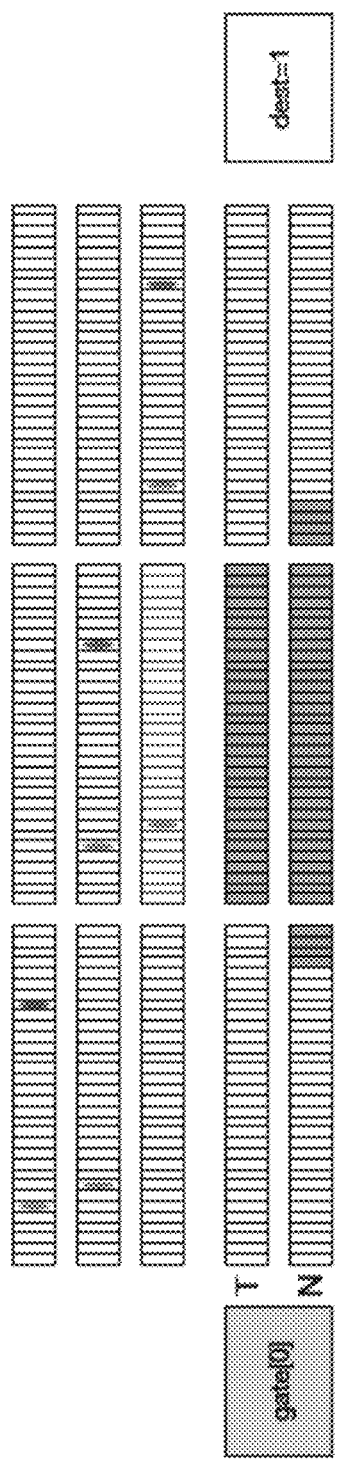
FIG. 13 depicts a mask programming diagram for a purity sort decision according to certain embodiments.
Figure 14:
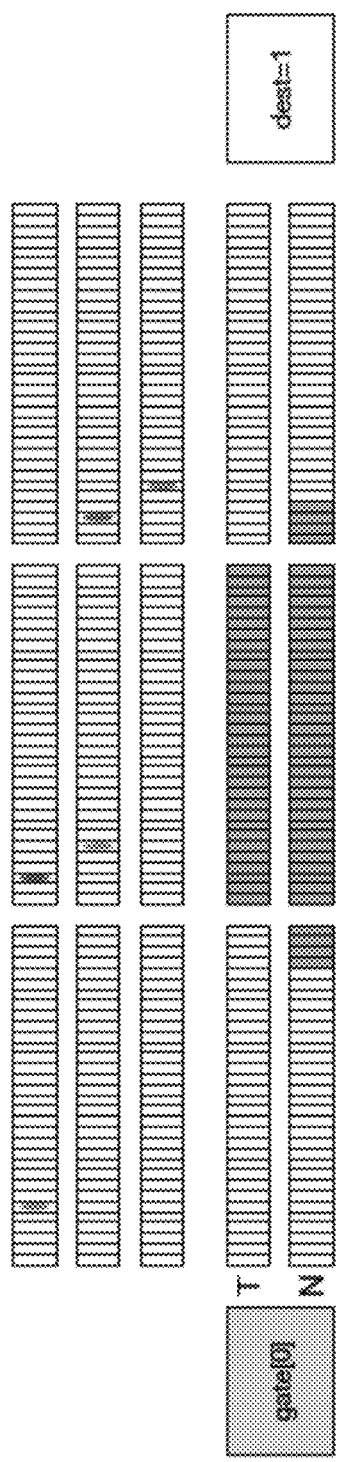
FIG. 14 depicts a mask programming diagram for a purity sort decision according to another embodiment.
Figure 15:
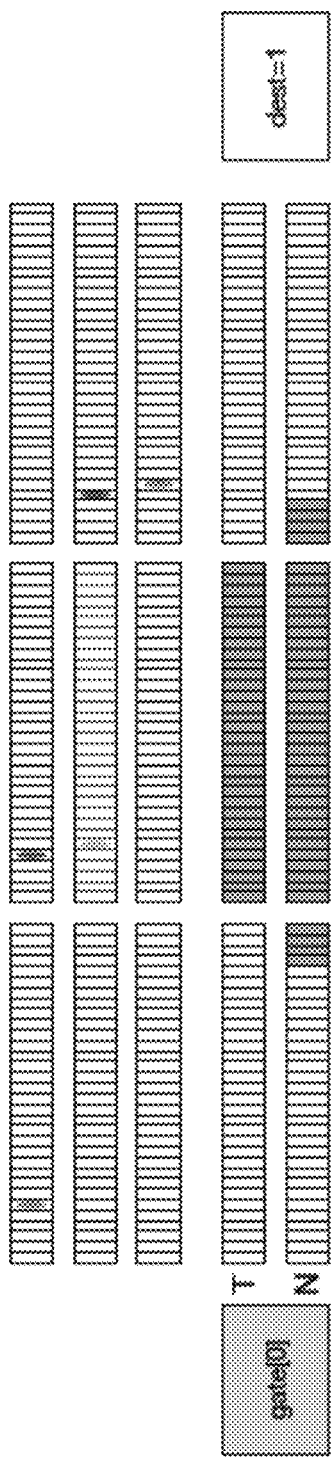
FIG. 15 depicts a mask programming diagram for a purity sort decision according to another embodiment.

In a purity sort, a drop is sorted to destination 1 if there are drops with gate bit zero set, and the drop contains no non-matching events. FIG. 13 depicts a simple purity sort according to certain embodiments. FIG. 14 depicts where a non-target particle in the adjacent drop edge causes a drop to not be sorted. FIG. 15 depicts where if the non-target cell in the adjacent drop moves further away, the drop is sorted.

Purity Yield Sort

Figure 16:
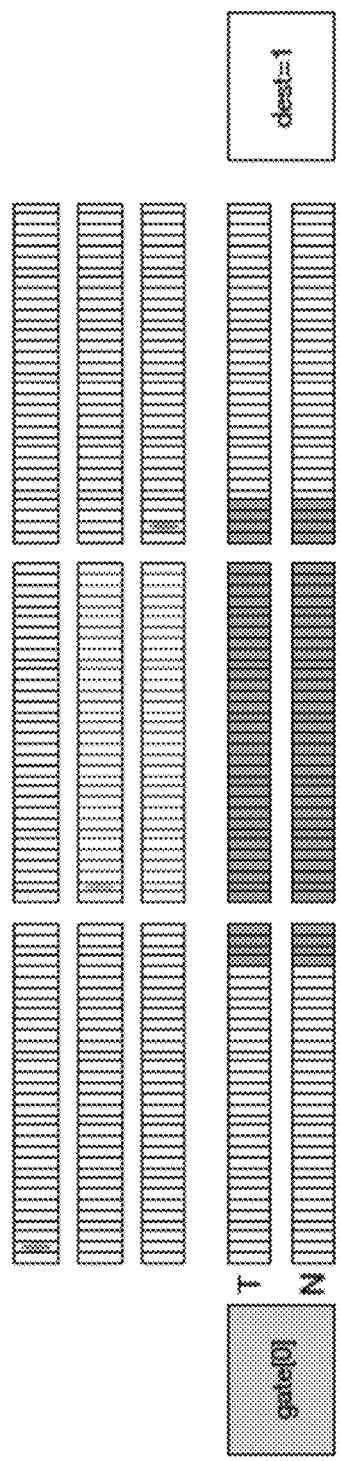
FIG. 16 depicts a mask programming diagram for a purity yield sort decision according to certain embodiments.
Figure 17:
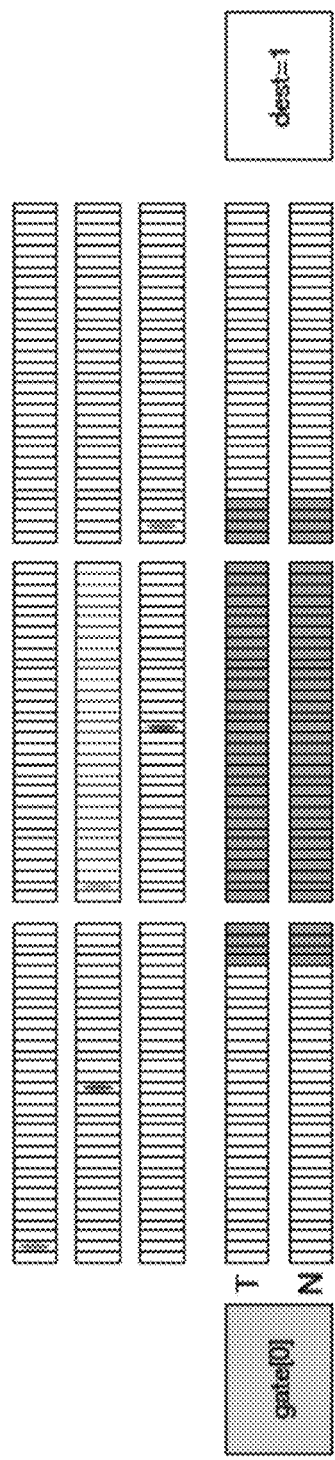
FIG. 17 depicts a mask programming diagram for a purity yield sort decision according to another embodiment.

In a purity yield sort, the purity yield configuration sorts drops and adjacent drops if they contain no non-target particles. FIG. 16 depicts a purity yield sort where a drop with a target particle and the trailing drop are sorted. FIG. 17 depicts where if the trailing drop contains a non-target event, the trailing drop won't be sorted.

Phase Purity Sort

Figure 18:
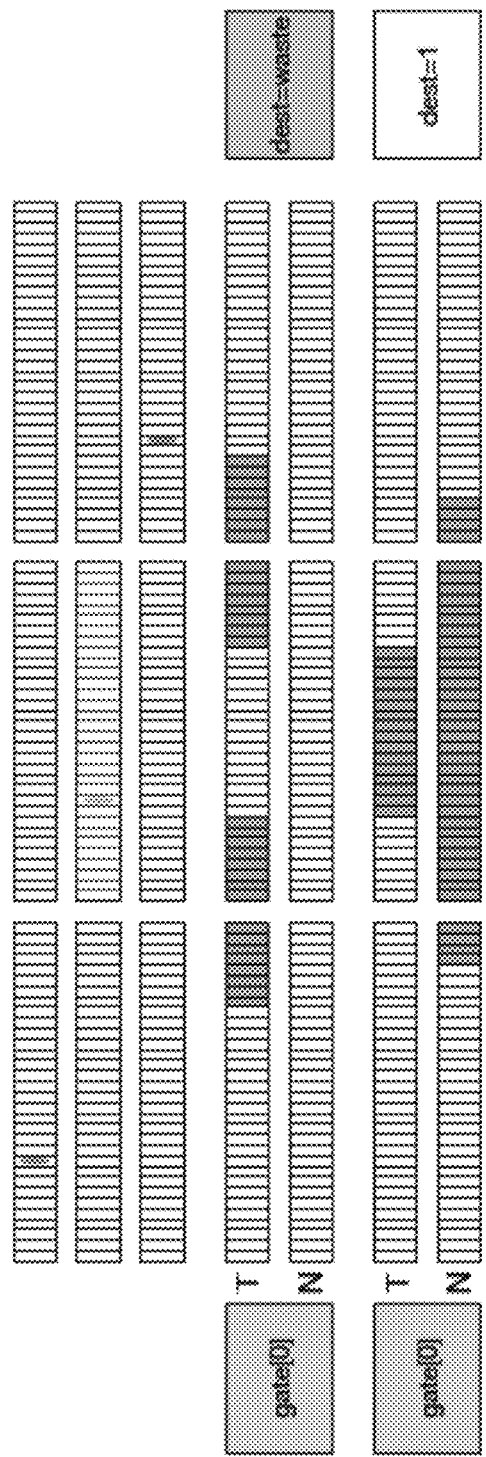
FIG. 18 depicts a mask programming diagram for a phase purity sort decision according to certain embodiments.
Figure 19:
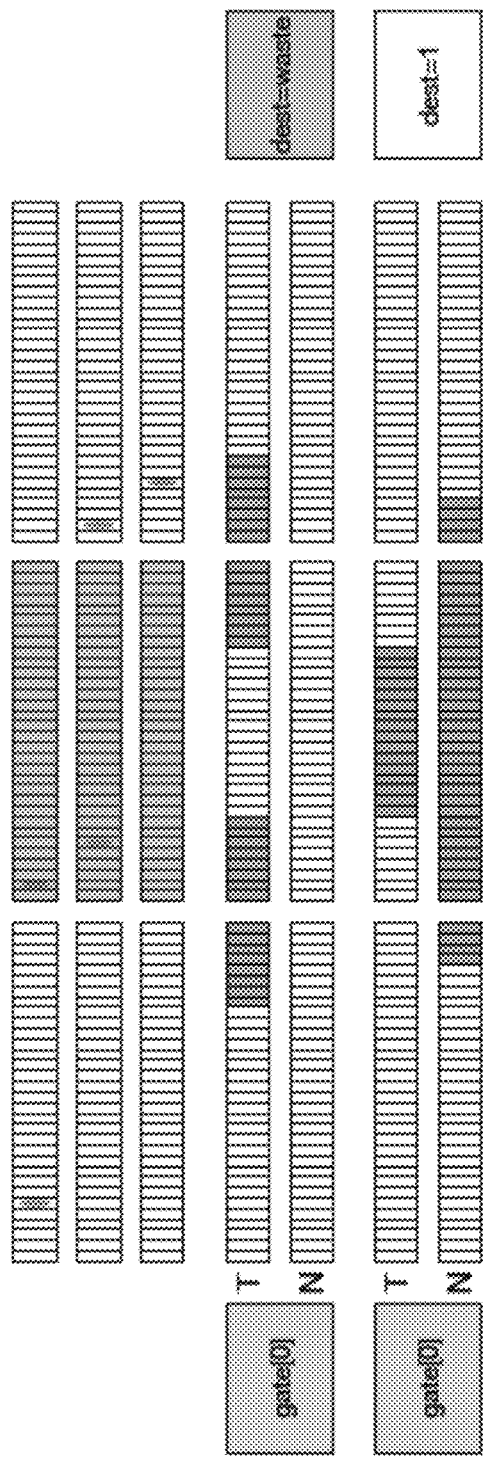
FIG. 19 depicts a mask programming diagram for a phase purity sort decision according to another embodiment.
Figure 20:
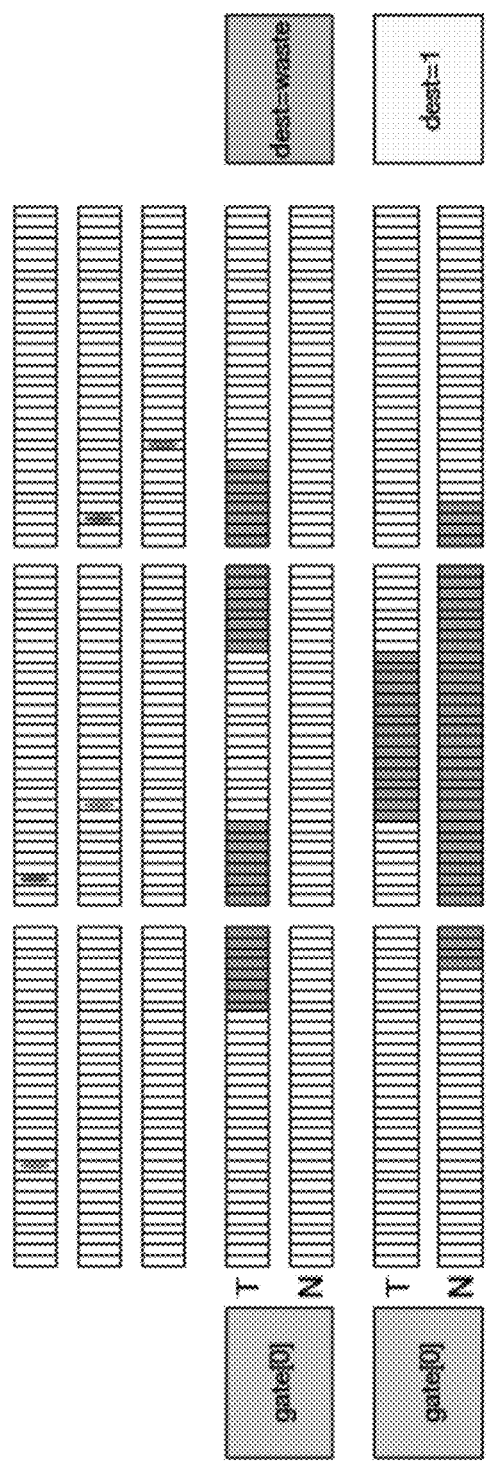
FIG. 20 depicts a mask programming diagram for a phase purity sort decision according to another embodiment.
Figure 21:
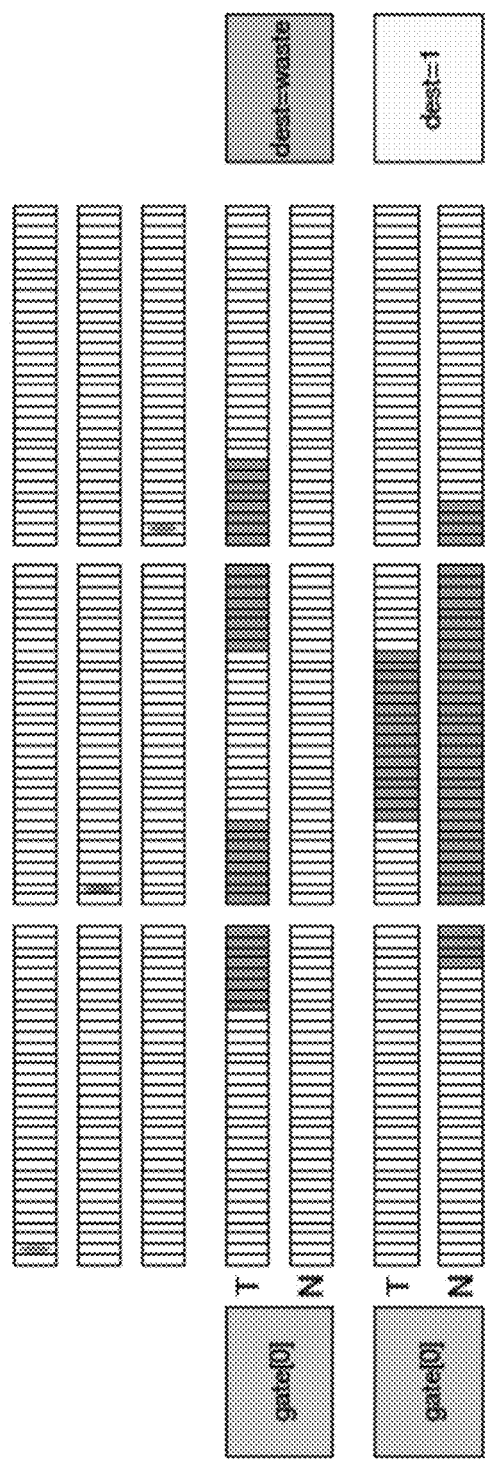
FIG. 21 depicts a mask programming diagram for a phase purity sort decision according to another embodiment.

A phase purity sort increases both the phase sort and the purity sort. Non-target particles that contaminates the sorted drop are to be avoided and an aim to have the target particle in the center of the sorted drop. FIG. 18 depicts a sort where the target particle is sufficiently close to the center of the drop to qualify for sorting. FIG. 19 depicts where if a target particle appears near the edge of an adjacent drop, the drop will not be sorted. FIG. 20 depicts where a non-target particle near the edge of the leading drop causes an in-phase target particle to not sort. FIG. 21 depicts where a target particle is not sorted due to its proximity to the drop edge (i.e., the target particle is too close to the drop edge to qualify for sorting).

Single Cell Purity

Another sort is for the number of target particles in the drop. In certain instances, this sort is for a single particle (e.g., single cell). Since the count value is an input to the match logic function, it is compared to a constant.

Figure 22:
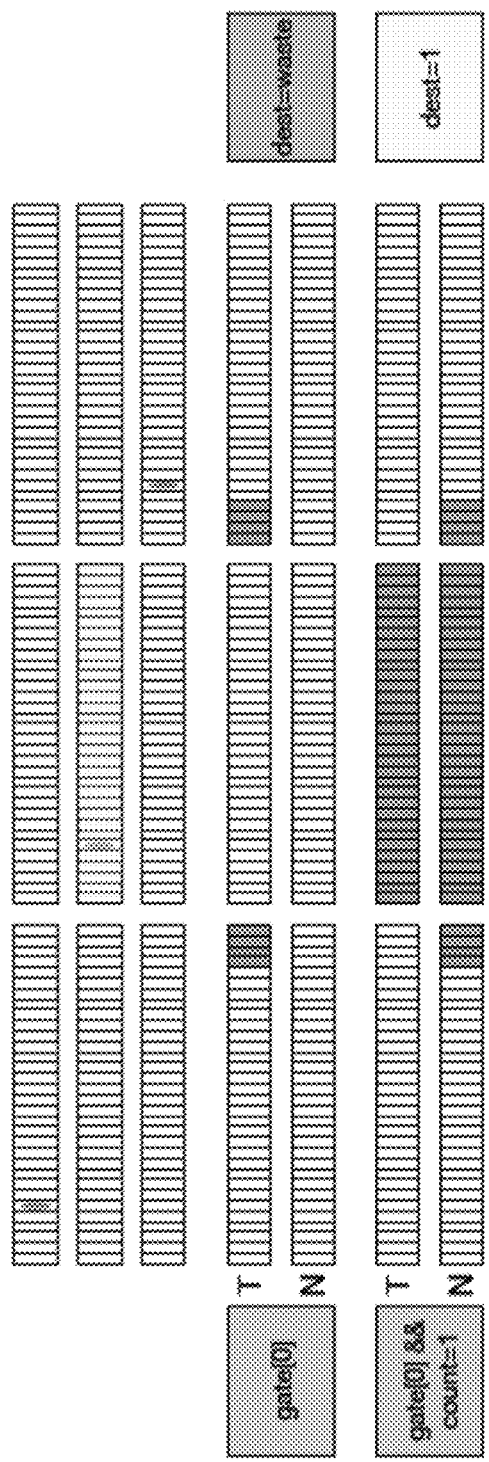
FIG. 22 depicts a mask programming diagram for a single cell purity sort decision according to certain embodiments.
Figure 23:
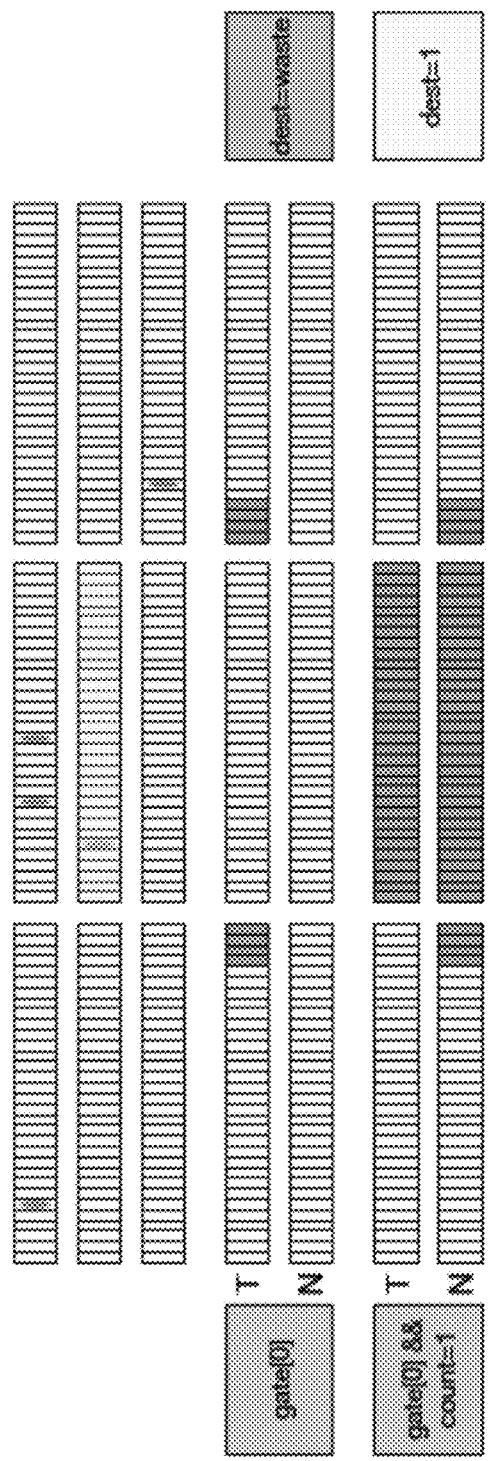
FIG. 23 depicts a mask programming diagram for a single cell purity sort decision according to another embodiment.
Figure 24:
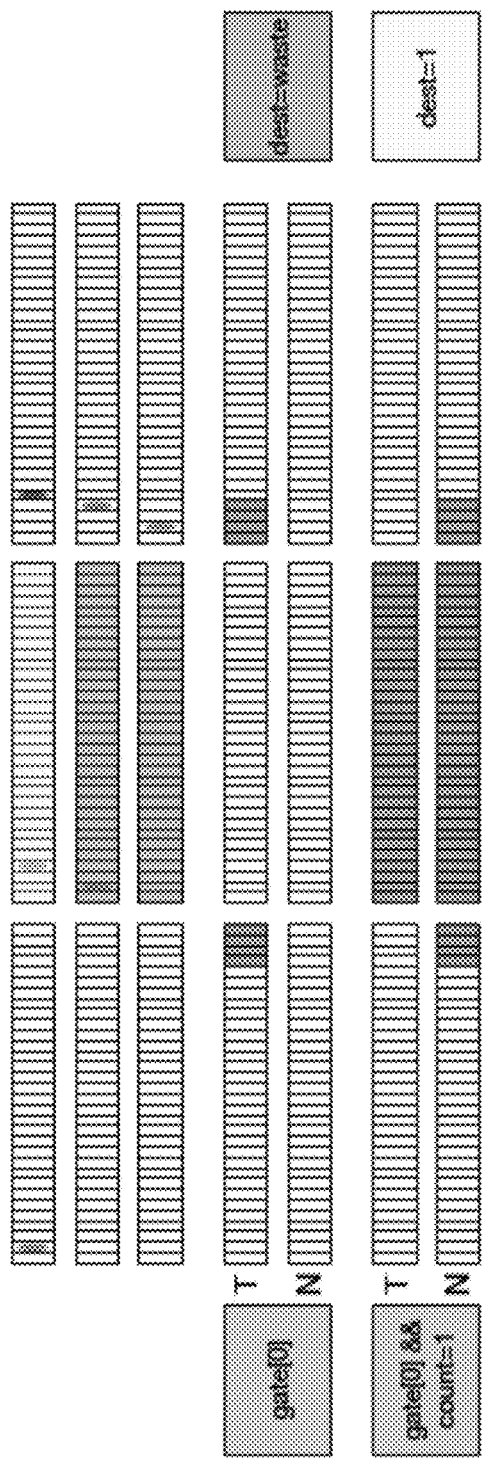
FIG. 24 depicts a mask programming diagram for a single cell purity sort decision according to another embodiment.

A sort decision unit looks for nearby target particles in adjacent drops, sending them to waste. A second unit detects the target particle, verifying that the target particle count is one. Then, any drops with a single target particle are accepted and non-target particles are not accepted. FIG. 22 depicts where a target particle is sorted because it is the only event in a drop and isn't near the drop's edge. FIG. 23 depicts where a drop that contains two particles is not sorted, but the following drop is sorted. FIG. 24 depicts where a drop with target particles is sorted while the following drop is rejected. In this embodiment, a drop is sorted because it contains one particle, and the leading drop has a non-target particle that is sufficiently far away from the drop edge. The following drop, however, is not sorted because a target particle is too close to the trailing drop's edge.

Single Cell Purity with Abort Save

Figure 25:
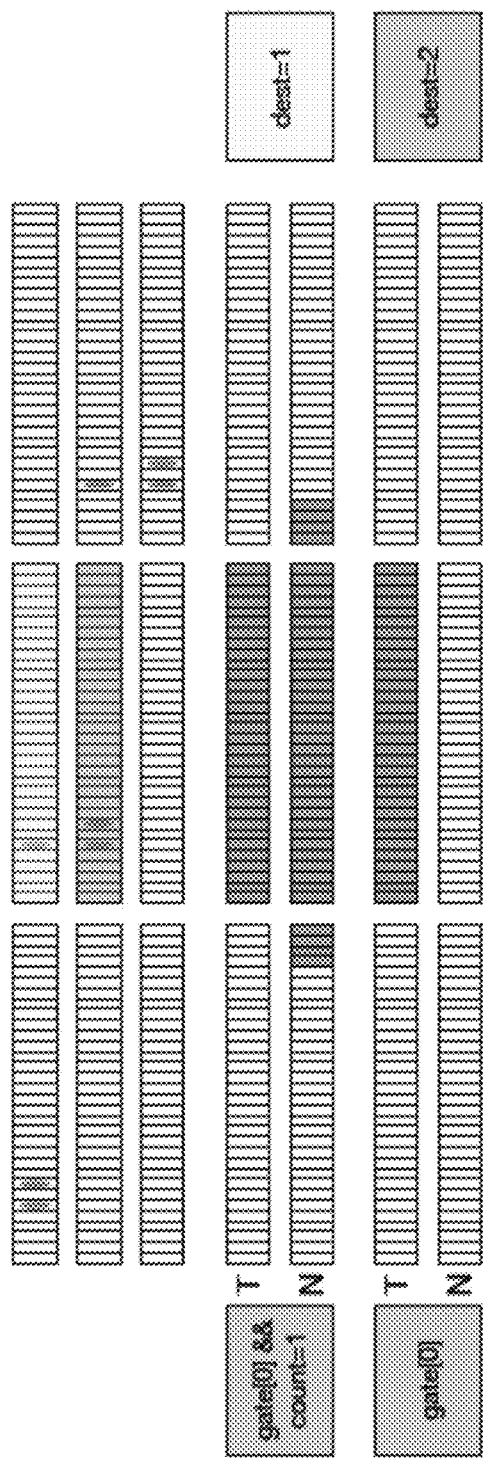
FIG. 25 depicts a mask programming diagram for a single cell purity sort with abort save decision according to certain embodiments.

In some instances, drops that would otherwise be wasted to a destination are saved. In this example, a simple purity sort to destination one is configured, but a lower-priority sort unit is configured to catch target particles that have escaped sorting by the first unit. These drops are directed to destination two. FIG. 25 depicts where one drop is that has a single target particle is sorted to destination one, while the second is diverted to destination two.

Single Cell Phase with Abort Save

Figure 26:
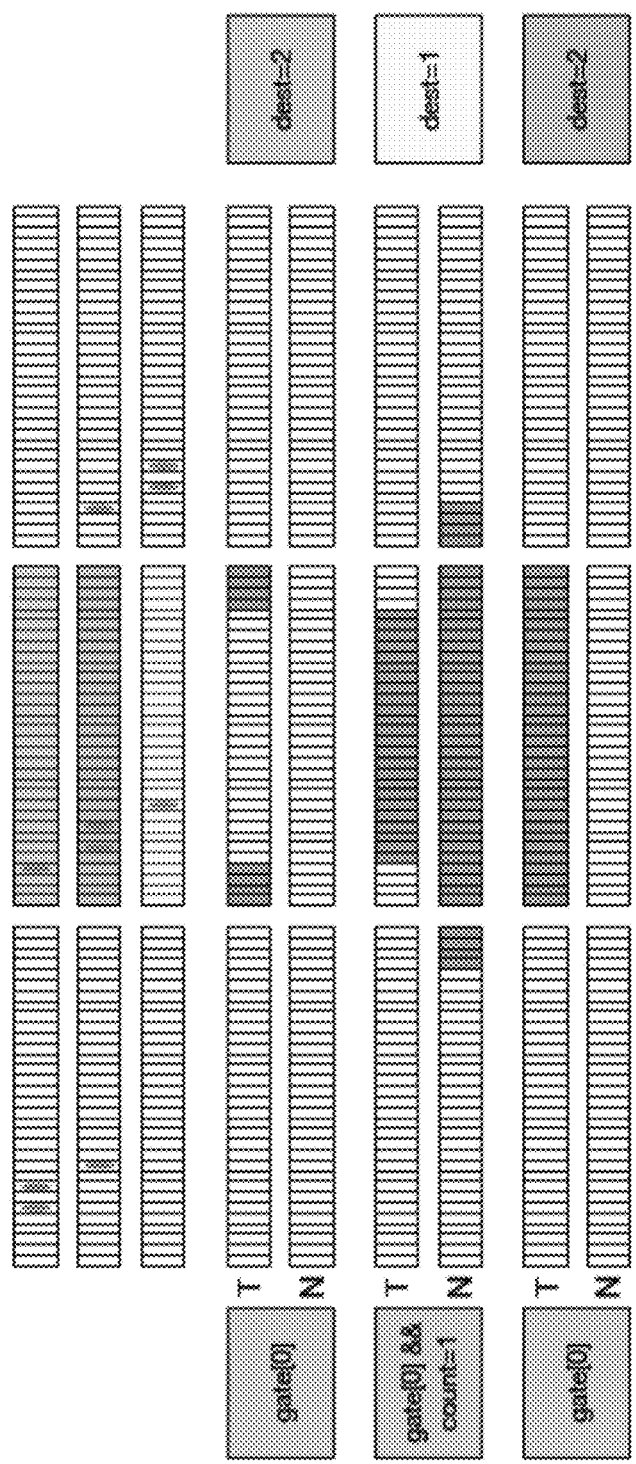
FIG. 26 depicts a mask programming diagram for a single cell phase sort with abort save decision according to certain embodiments.

In some instances, an abort save is combined with a phase sort. A first unit sorts out-of-phase target particles to destination two. Drops with a single target particle and no non-target particles are sent by a second unit to destination one, and a third unit acts as a catch-all to send any remaining target particles to destination two. FIG. 26 depicts where a phase sort single target particles going to destination one with other drops with target particles going to destination two.

Notwithstanding the appended claims, the disclosure is also defined by the following clauses:

1. A droplet sorting module for sorting droplets of a flow stream, the module comprising:
    a plurality of droplet sort decision units, each droplet sort decision unit comprising:
        event match logic; and
        sort decision logic; and
    a processor and a memory operably coupled to the processor, wherein the memory comprises instructions stored thereon, which when executed by the processor, cause the processor to determine an optimal droplet sort decision unit from the plurality of sort decision units for sorting each droplet of the flow stream.

2. The droplet sorting module according to clause 1, wherein the event match logic is configured to generate a data signal that a droplet comprises a particle.

3. The droplet sorting module according to clause 2, wherein the particle is a target cell.

4. The droplet sorting module according to clause 2, wherein the particle is a non-target cell.

5. The droplet sorting module according to any one of clauses 1-4, wherein the sort decision logic is configured to receive a data signal corresponding to the position of one or more particles in the droplet.

6. The droplet sorting module according to clause 5, wherein the one or more particles comprise a target cell.

7. The droplet sorting module according to clause 5, wherein the one or more particles comprise a non-target cell.

8. The droplet sorting module according to any one of clauses 1-7, wherein the sort decision logic is configured to receive a data signal corresponding to the position of one or more particles in a plurality of sequential droplets.

9. The droplet sorting module according to any one of clauses 1-7, wherein the sort decision logic is configured to receive a data signal corresponding to the position of one or more particles in three sequential droplets.

10. The droplet sorting module according to any one of clauses 5-9, wherein the sort decision logic comprises:
    a target mask that identifies positions of target cells that are relevant to sorting the droplet; and.
    a non-target mask that identifies positions of non-target particles that are relevant to sorting the droplet.

11. The droplet sorting module according to clause 10, wherein the sort decision logic is configured to:
    apply the target mask to the data signal corresponding to the position of the one or more target cells in the droplet to generate a target drop value;
    apply the non-target mask to the data signal corresponding to the position of the one or more non-target particles in the droplet to generate a non-target drop value; and
    combine the target drop value with the non-target drop value to generate a target match value.

12. The droplet sorting module according to any one of clauses 4-11, where the sort decision logic is configured to determine the number of target cells in the droplet to generate a target count value.

13. The droplet sorting module according to clause 12, wherein the memory comprises instructions stored thereon, which when executed by the processor, cause the processor to:

compare the target count value and the target match value for each sort decision unit; and determine the optimal sort decision unit for sorting the droplet based on the target count value and the target match value of each sort decision unit.

14. The droplet sorting module according to clause 13, wherein the memory comprises instructions stored thereon, which when executed by the processor, cause the processor to rank each sort decision unit based on the target match values.

15. The droplet sorting module according to clause 14, wherein the memory comprises instructions stored thereon, which when executed by the processor, cause the processor to determine that the sort decision unit that is optimal for sorting the droplet is the sort decision unit comprising the highest target match value.

16. The droplet sorting module according to any one of clauses 12-15, wherein the memory comprises instructions stored thereon, which when executed by the processor, cause the processor to determine that the sort decision unit is not optimal for sorting the droplet when the target count value exceeds a predetermined threshold.

17. The droplet sorting module according to any one of clauses 1-15, wherein the memory comprises instructions stored thereon, which when executed by the processor, cause the processor to determine that a sort decision unit is not optimal for sorting the droplet when the sort decision unit was used for sorting a preceding droplet.

18. A method for sorting droplets of a flow stream, the method comprising:
   detecting a particle in a droplet;
   generating a data signal that the droplet comprises the particle;
   receiving the data signal with a droplet sorting module comprising a plurality of droplet sort decision units, each droplet sort decision unit comprising:
      event match logic; and
      sort decision logic; and
   determining an optimal droplet sort decision unit from the plurality of sort decision units for sorting the droplet; and
   sorting the droplet with the determined optimal droplet sort decision unit.

19. The method according to clause 1, wherein the method comprises determining the position of the particle in the droplet.

20. The method according to any one of clauses 18-19, wherein the particle is a target cell.

21. The method according to any one of clauses 18-19, wherein the particle is a non-target cell.

22. The method according to any one of clauses 19-21, wherein the method comprises determining the position of one or more particles in a plurality of sequential droplets.

23. The method according to clause 22, wherein the method comprises determining the position of one or more particles in three sequential droplets.

24. The method according to any one of clauses 18-23, wherein the sort decision logic comprises:
   a target mask that identifies positions of target cells that are relevant to sorting the droplet; and.
   a non-target mask that identifies positions of non-target particles that are relevant to sorting the droplet.

25. The method according to clause 24, further comprising:
   applying the target mask to a data signal corresponding to the position of one or more target cells in the droplet to generate a target drop value;
   applying the non-target mask to a data signal corresponding to the position of one or more non-target particles in the droplet to generate a non-target drop value; and
   combining the target drop value with the non-target drop value to generate a target match value.

26. The method according to clause 25, further comprising determining the number of target cells in the droplet to generate a target count value.

27. The method according to clause 26, further comprising:
   comparing the target count value and the target match value for each sort decision unit; and
   determining the optimal sort decision unit for sorting the droplet based on the target count value and the target match value of each sort decision unit.

28. The method according to clause 27, wherein determining the optimal sort decision unit for sorting the droplet comprises ranking each sort decision unit based on the target match values.

29. The method according to clause 28, wherein determining the optimal sort decision unit for sorting the droplet comprises determining the sort decision unit comprising the highest target match value.

30. The method according to any one of clauses 26-29, further comprising determining that the sort decision unit is not optimal for sorting the droplet when the target count value exceeds a predetermined threshold.

31. The method according to any one of clauses 18-30, further comprising determining that a sort decision unit is not optimal for sorting the droplet when the sort decision unit was used for sorting a preceding droplet.

32. A cell sorter comprising:
   a flow cell configured to propagate a sample comprising particles in a flow stream;
   a droplet sorting module for sorting droplets of the flow stream, the module comprising:
      a plurality of droplet sort decision units, each droplet sort decision unit comprising:
         event match logic; and
         sort decision logic; and
      a processor and a memory operably coupled to the processor wherein the memory comprises instructions stored thereon, which when executed by the processor, cause the processor to determine an optimal droplet sort decision unit from the plurality of sort decision units for sorting each droplet of the flow stream;
   one or more sample containers configured to collect sorted droplets from the flow stream.

33. The cell sorter according to clause 32, further comprising a droplet formation module configured to generate droplets from the flow stream.

34. The cell sorter according to clause 33, wherein the droplet formation module comprises drop assembly logic configured to determine the presence of a particle in a droplet.

35. The cell sorter according to clause 34, wherein the drop assembly logic is configured to determine the position of the particle in the droplet.

36. The cell sorter according to any one of clauses 34-35, wherein the particle is a target cell.

37. The cell sorter according to any one of clauses 34-35, wherein the particle is a non-target cell.

38. The cell sorter according to any one of clauses 32-37, further comprising a light source configured to irradiate the flow stream.

39. The cell sorter according to clause 38, wherein the light source is a laser.

40. The cell sorter according to any one of clauses 38-39, further comprising a sensor configured to detect light signals from the irradiated flow stream.

41. The cell sorter according to any one of clauses 32-40, wherein the event match logic is configured to generate a data signal that a droplet comprises a particle.

42. The cell sorter according to clause 41, wherein the event match logic is configured to generate a data signal that a droplet comprises a target cell.

43. The cell sorter according to any one of clauses 32-42, wherein the sort decision logic is configured to receive a data signal corresponding to the position of one or more particles in the droplet.

44. The cell sorter according to clause 43, wherein the sort decision logic is configured to receive a data signal corresponding to the position of one or more particles in a plurality of sequential droplets.

45. The cell sorter according to clause 44, wherein the sort decision logic is configured to receive a data signal corresponding to the position of one or more particles in three sequential droplets.

46. The cell sorter according to any one of clauses 32-45, wherein the sort decision logic comprises:
    a target mask that identifies positions of target cells that are relevant to sorting the droplet; and
    a non-target mask that identifies positions of non-target particles that are relevant to sorting the droplet.

47. The cell sorter according to clause 46, wherein the sort decision logic is configured to:
    apply the target mask to the data signal corresponding to the position of the one or more target cells in the droplet to generate a target drop value;
    apply the non-target mask to the data signal corresponding to the position of the one or more non-target particles in the droplet to generate a non-target drop value; and
    combine the target drop value with the non-target drop value to generate a target match value.

48. The cell sorter according to any one of clauses 46-47, where the sort decision logic is configured to determine the number of target cells in the droplet to generate a target count value.

49. The cell sorter according to clause 48, wherein the memory comprises instructions stored thereon, which when executed by the processor, cause the processor to:
    compare the target count value and the target match value for each sort decision unit; and
    determine the optimal sort decision unit for sorting the droplet based on the target count value and the target match value of each sort decision unit.

50. The cell sorter according to clause 49, wherein the memory comprises instructions stored thereon, which when executed by the processor, cause the processor to rank each sort decision unit based on the target match values.

51. The cell sorter according to clause 50, wherein the memory comprises instructions stored thereon, which when executed by the processor, cause the processor to determine that the sort decision unit that is optimal for sorting the droplet is the sort decision unit comprising the highest target match value.

52. The cell sorter according to any one of clauses 49-51, wherein the memory comprises instructions stored thereon, which when executed by the processor, cause the processor to determine that the sort decision unit is not optimal for sorting the droplet when the target count value exceeds a predetermined threshold.

53. The cell sorter according to any one of clauses 32-52, wherein the memory comprises instructions stored thereon, which when executed by the processor, cause the processor to determine that a sort decision unit is not optimal for sorting the droplet when the sort decision unit was used for sorting a preceding droplet.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A cell sorter comprising:
a flow cell configured to propagate a sample comprising particles in a flow stream;
a droplet sorting module comprising computational hardware for sorting droplets of the flow stream, the module comprising:
a plurality of droplet sort decision units, each droplet sort decision unit comprising:
event match logic that is configured to generate a data signal that a droplet comprises a particle; and
sort decision logic that is configured to:
receive a data signal where the droplet is divided into a plurality of bit positions and identifies the bit position of one or more particles within the droplet;
apply a target mask that identifies positions of target particles that are relevant to sorting the droplet;
apply a non-target mask that identifies positions of non-target particles that are relevant to sorting the droplet,
wherein target particles are particles to be sorted and non-target particles are particles that are not to be sorted; and
a processor and a memory operably coupled to the processor wherein the memory comprises instructions stored thereon, which when executed by the processor, cause the processor to determine a droplet sort decision unit from the plurality of sort decision units for sorting each droplet of the flow stream.

2. The cell sorter according to claim 1, further comprising a droplet formation module comprising computational hardware configured to generate droplets comprising a plurality of bit positions.

3. The cell sorter according to claim 2, wherein the droplet formation module comprises drop assembly logic configured to determine the presence of a particle in a droplet.

4. The cell sorter according to claim 3, wherein the drop assembly logic is configured to determine the position of the particle in the droplet.

5. The cell sorter according to claim 3, wherein the particle is a target cell wherein a target cell is a cell to be sorted.

6. The cell sorter according to claim 3, wherein the particle is a non-target cell wherein a non-target cell is a cell not to be sorted.

7. The cell sorter according to claim 1, further comprising a light source configured to irradiate the flow stream.

8. The cell sorter according to claim 7, wherein the light source is a laser.

9. The cell sorter according to claim 7, further comprising a sensor configured to detect light signals from the irradiated flow stream.

10. The cell sorter according to claim 1, wherein the event match logic is configured to generate a data signal that a droplet comprises a target cell wherein a target cell is a cell to be sorted.

11. The cell sorter according to claim 1, wherein the sort decision logic is configured to receive a data signal corresponding to the position of one or more particles in a plurality of sequential droplets.

12. The cell sorter according to claim 11, wherein the sort decision logic is configured to receive a data signal corresponding to the position of one or more particles in three sequential droplets.

13. The cell sorter according to claim 1, wherein the sort decision logic is configured to:
apply the target mask to the data signal corresponding to the position of the one or more target cells in the droplet to generate a target drop value;
apply the non-target mask to the data signal corresponding to the position of the one or more non-target particles in the droplet to generate a non-target drop value; and
combine the target drop value with the non-target drop value to generate a target match value.

14. The cell sorter according to claim 1, where the sort decision logic is configured to determine the number of target cells in the droplet to generate a target count value.

15. The cell sorter according to claim 14, wherein the memory comprises instructions stored thereon, which when executed by the processor, cause the processor to:
compare the target count value and the target match value for each sort decision unit; and
determine the sort decision unit for sorting the droplet based on the target count value and the target match value of each sort decision unit.

16. The cell sorter according to claim 15, wherein the memory comprises instructions stored thereon, which when executed by the processor, cause the processor to rank each sort decision unit based on the target match values.

17. The cell sorter according to claim 16, wherein the memory comprises instructions stored thereon, which when executed by the processor, cause the processor to determine that the sort decision unit that is used for sorting the droplet is the sort decision unit comprising the highest target match value.

18. The cell sorter according to claim 15, wherein the memory comprises instructions stored thereon, which when executed by the processor, cause the processor to determine that the sort decision unit is not used for sorting the droplet when the target count value exceeds a predetermined threshold.

19. The cell sorter according to claim 1, wherein the memory comprises instructions stored thereon, which when executed by the processor, cause the processor to determine that a sort decision unit is not used for sorting the droplet when the sort decision unit was used for sorting a preceding droplet.

20. The cell sorter according to claim 1, wherein the sorter further comprises one or more sample containers configured to collect sorted droplets from the flow stream.

21. The cell sorter according to claim 1, wherein the computational hardware of the droplet sorting module comprises one or more of an integrated circuit and a programmable logic block.

22. The cell sorter according to claim 21, wherein the computational hardware of the droplet sorting module comprises one or more field programmable gate arrays (FPGA).

* * * * *